United States Patent
Matsunaga et al.

(10) Patent No.: US 8,729,189 B2
(45) Date of Patent: May 20, 2014

(54) PROPYLENE-BASED BLOCK COPOLYMER, COMPOSITION CONTAINING THE COPOLYMER, AND MOLDED PRODUCTS OBTAINED THEREFROM

(75) Inventors: Kazuhisa Matsunaga, Otake (JP); Keita Itakura, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 121 days.

(21) Appl. No.: 13/120,031

(22) PCT Filed: Sep. 17, 2009

(86) PCT No.: PCT/JP2009/066274
§ 371 (c)(1),
(2), (4) Date: Mar. 21, 2011

(87) PCT Pub. No.: WO2010/032793
PCT Pub. Date: Mar. 25, 2010

(65) Prior Publication Data
US 2011/0172353 A1     Jul. 14, 2011

(30) Foreign Application Priority Data
Sep. 22, 2008 (JP) ................. 2008-242799

(51) Int. Cl.
| | | |
|---|---|---|
| C08F 8/00 | (2006.01) | |
| C08G 63/48 | (2006.01) | |
| C08G 63/91 | (2006.01) | |
| C08L 23/14 | (2006.01) | |
| C08F 10/06 | (2006.01) | |
| C08F 4/76 | (2006.01) | |
| C08F 293/00 | (2006.01) | |
| C08L 23/20 | (2006.01) | |

(52) U.S. Cl.
USPC ............ 525/323; 525/55; 525/247; 524/570

(58) Field of Classification Search
USPC ........................................... 526/351
See application file for complete search history.

(56) References Cited

U.S. PATENT DOCUMENTS 4,210,738 A    7/1980 Hermans et al.
(Continued)

FOREIGN PATENT DOCUMENTS

EP    0 585 869 A1    3/1994
(Continued)

OTHER PUBLICATIONS

English translation of JP 2008-024751 (which was provided by Applicant).*

(Continued)

Primary Examiner — Ling Choi
Assistant Examiner — Catherine S Branch
(74) Attorney, Agent, or Firm — Foley & Lardner LLP

(57) ABSTRACT

The present invention provides a propylene-based block copolymer having high melt viscoelasticity, excellent balance between rigidity and impact resistance, good molding processability, and excellent molded product appearance, a composition containing the copolymer, and molded products obtained therefrom. The propylene-based block copolymer comprises 5 to 80% by weight of a room temperature n-decane-soluble portion (Dsol) and 20 to 95% by weight of a room temperature n-decane-insoluble portion (Dinsol) (the total amount of the Dsol and the Dinsol is 100% by weight), and satisfies the requirements [1] to [3]: [1] the molecular weight distribution (Mw/Mn) of the Dsol is 7.0 to 30, [2] the molecular weight distribution (Mw/Mn) of the Dinsol is 7.0 to 30, and Mz/Mw thereof is 6.0 to 20, and [3] the pentad fraction (mmmm) of the Dinsol is not less than 93%.

12 Claims, 1 Drawing Sheet

(56) References Cited

U.S. PATENT DOCUMENTS

| | | |
|---|---|---|
| 5,652,303 A | 7/1997 | Ishimaru et al. |
| 6,214,939 B1 | 4/2001 | Shinozaki et al. |
| 7,238,758 B2 | 7/2007 | Yoshikiyo et al. |
| 7,649,062 B2 | 1/2010 | Matsunaga et al. |
| 7,923,501 B2 | 4/2011 | Shimouse et al. |
| 2010/0227991 A1 | 9/2010 | Matsunaga et al. |
| 2010/0305285 A1 | 12/2010 | Matsunaga et al. |

FOREIGN PATENT DOCUMENTS

| | | |
|---|---|---|
| JP | 47-034478 | 11/1972 |
| JP | 03-007703 | 1/1991 |
| JP | 05-170843 | 7/1993 |
| JP | 08-120021 | 5/1996 |
| JP | 2001-354714 | 12/2001 |
| JP | 2002-138176 | 5/2002 |
| JP | 2008-024751 A | 2/2008 |
| JP | 2008-163120 | 7/2008 |
| JP | 2011-184620 A | 9/2011 |
| JP | 2011-190407 A | 9/2011 |
| JP | 2011-190408 A | 9/2011 |
| JP | 2011-195661 A | 10/2011 |
| JP | 2011-195662 A | 10/2011 |
| WO | WO-2004/016662 A1 | 2/2004 |
| WO | WO-2006/077945 A1 | 7/2006 |
| WO | WO-2006/077946 A1 | 7/2006 |
| WO | WO-2009/057747 A1 | 5/2009 |
| WO | WO-2009/069483 A1 | 6/2009 |

OTHER PUBLICATIONS

Supplementary European Search Report EP Appln. No. 09814637 dated Jun. 27, 2012.

International Search Report in PCT/JP2009/066274 dated Dec. 8, 2009.

Macromolecules, American General Society, vol. 8, No. 5, Sep./Oct. 1975, pp. 687-689.

Japanese Office Action No. 2010-529792 dated Jul. 30, 2013.

* cited by examiner

PROPYLENE-BASED BLOCK COPOLYMER, COMPOSITION CONTAINING THE COPOLYMER, AND MOLDED PRODUCTS OBTAINED THEREFROM

TECHNICAL FIELD

The present invention relates to a propylene-based block copolymer, a composition containing the copolymer and molded products obtained therefrom. More particularly, the present invention relates to a propylene-based block copolymer having excellent balance between rigidity and impact resistance, good molding processability and extremely excellent appearance properties in the molding process, a composition containing the copolymer and molded products obtained therefrom.

BACKGROUND ART

Propylene-based polymers are generally widely utilized for automotive interior trim or automotive exterior trim such as fender, bumper, side molding, mud guard and mirror cover by subjecting the polymers to injection molding, because of their excellent rigidity, hardness and heat resistance.

Moreover, a polypropylene composition having been improved in impact resistance by adding polyethylene, a rubber component, a non-crystalline or low-crystalline ethylene/propylene copolymer (EPR), a non-crystalline ethylene/α-olefin copolymer or the like to a propylene-based polymer or by directly polymerizing them according to the use purpose and a polypropylene composition to which an inorganic filler such as talc has been further added in order to make up for rigidity lowered by blending the rubber component are also well known. In the case of such propylene-based polymers, however, further weight-lightening and wall-thinning of their molded articles have been desired, and in order to obtain molded articles not only realizing them but also having sufficient strength, a propylene-based polymer having more improved balance between rigidity and impact resistance (that is, excellent in both of rigidity and impact resistance) or a composition comprising the polymer has been desired. Furthermore, a propylene-based polymer capable of improving a molded product appearance defect called "flow mark" caused by irregular flow of a molten resin formed in the molding process or a composition comprising the polymer has been also desired.

As a means to solve such a problem, a technique of widening a molecular weight distribution of a propylene-based polymer is generally known. In particular, a propylene-based polymer containing a high-molecular weight component exerts an excellent effect. In the past, there have been made a large number of reports that the balance between rigidity and impact resistance has been improved by, for example, a method wherein a polymer having different molecular weights is prepared by multi-stage polymerization to widen a molecular weight distribution of the polymer (Japanese Patent Laid-Open Publication No. 170843/1993 (patent literature 1)), a method wherein a catalyst containing plural kinds of electron donors is used (Japanese Patent Laid-Open Publication No. 7703/1991 (patent literature 2)), and a method wherein an olefin polymerization catalyst using a solid titanium catalyst component and using an aluminum alkyl compound and a nitrogen-containing aliphatic silicon compound as co-catalysts (Japanese Patent Laid-Open Publication No. 120021/1996 (patent literature 3)) is used to widen a molecular weight distribution. Moreover, a method wherein various propylene resin compositions are mixed to improve appearance properties with maintaining rigidity and impact resistance (Japanese Patent Laid-Open Publication No. 163120/2008 (patent literature 4)), etc. have been also reported. Furthermore, there have been made a large number of reports that a titanium trichloride catalyst ($TiCl_3$) hitherto well known is also a catalyst capable of achieving widening of a molecular weight distribution (Japanese Patent Laid-Open Publication No. 34478/1972 (patent literature 5)).

In the patent literatures 1 and 2, however, the molded product appearance has not been improved though the balance between rigidity and impact resistance has been improved. In the patent literature 3, improvement in flow mark of molded product appearance is insufficient. In the patent literature 4, flow mark of molded product appearance is improved, but the propylene/ethylene rubber component of a high molecular weight is aggregated to sometimes cause a defect of graininess on the molded product surface. In the patent literature 5, widening of a molecular weight distribution can be achieved by taking advantage of features of the catalyst, but because of a large amount of a residual metal due to low activity, of the catalyst, deashing step is necessary, or because of extremely low stereoregularity, there is a disadvantage that rigidity cannot be increased.

The present invention has been made in view of such prior art as mentioned above, and it is an object of the present invention to obtain, with a high activity, a propylene-based polymer which is excellent in both of rigidity and impact resistance and is very excellent also in its molded product appearance and to provide a composition containing the polymer and molded products obtained therefrom.

CITATION LIST

Patent Literature

Patent Literature 1: Japanese Patent Laid-Open Publication No. 170843/1993
Patent Literature 2: Japanese Patent Laid-Open Publication No. 7703/1991
Patent Literature 3: Japanese Patent Laid-Open Publication No. 120021/1996
Patent Literature 4: Japanese Patent Laid-Open Publication No. 163120/2008
Patent Literature 5: Japanese Patent Laid-Open Publication No. 34478/1972

SUMMARY OF INVENTION

Technical Problem

It is an object of the present invention to obtain, with a high activity, a propylene-based block copolymer which has high melt viscoelasticity, excellent valance between rigidity and impact resistance and good molding processability and is extremely excellent in its molded product appearance and to provide a composition containing the copolymer and molded products obtained therefrom.

Solution to Problem

In order to solve the above problems associated with the prior art, the present inventors have earnestly studied. As a result, the present inventors have found that from a propylene-based block copolymer containing a "propylene polymer of wide molecular weight distribution" (room temperature n-decane-insoluble portion (Dinsol), which has specific properties and comprises a crystalline propylene-based (co)polymer, and a "copolymer rubber of wide molecular weight distribution" (room temperature n-decane-soluble portion (Dsol), which has specific properties and comprises propylene and one or more olefins selected from ethylene and α-olefins of 4 to 20 carbon atoms, a molded product which is extremely excellent in its molded product appearance and has excellent balance between rigidity and impact resistance can be obtained because of wide molecular weight distributions of the Dsol and the Dinsol constituting the copolymer, high stereoregularity of the Dinsol and a high-molecular weight component contained in the Dsol, and they have accomplished the present invention.

That is to say, the propylene-based block copolymer of the present invention comprises 5 to 80% by weight of a room temperature n-decane-soluble portion (Dsol) and 20 to 95% by weight of a room temperature n-decane-insoluble portion (Dinsol), with the proviso that the total amount of the Dsol and the Dinsol is 100% by weight, and satisfies the following requirements [1] to [3] at the same time:

[1] the molecular weight distribution (Mw/Mn) of the Dsol is not less than 7.0 but not more than 30,

[2] the molecular weight distribution (Mw/Mn) of the Dinsol is not less than 7.0 but not more than 30, and Mz/Mw thereof is not less than 6.0 but not more than 20, and

[3] the pentad fraction (mmmm) of the Dinsol is not less than 93%.

The propylene-based block copolymer further satisfies, in addition to the above requirements [1] to [3], the following requirements [4] and [5]:

[4] the intrinsic viscosity [η] (dl/g) of the Dsol is not less than 1.5 but not more than 10.0, and

[5] Mz/Mn of the Dinsol is not less than 70 but not more than 300.

The room temperature n-decane-soluble portion (Dsol) contains, as a main component, a copolymer rubber comprising propylene and one or more olefins selected from ethylene and α-olefins of 4 to 20 carbon atoms, and the room temperature n-decane-insoluble portion (Dinsol) contains, as a main component, a crystalline propylene-based (co)polymer comprising 98.5 to 100% by mol of propylene and 0 to 1.5% by mol of one or more olefins selected from ethylene and α-olefins of 4 to 20 carbon atoms.

The step for preparing the copolymer rubber comprises polymerizing propylene and one or more olefins selected from ethylene and α-olefins of 4 to 20 carbon atoms in one stage.

The propylene-based block copolymer is obtained by polymerization in the presence of an olefin polymerization catalyst comprising a solid titanium catalyst component (I) containing titanium, magnesium, halogen, a cyclic ester compound (a) represented by the following formula (1) and a cyclic ester compound (b) represented by the following formula (2), an organometallic compound (II) containing a metal atom selected from Group 1, Group 2 and Group 13 of the periodic table, and if necessary, an electron donor (III);

[Chem. 1]

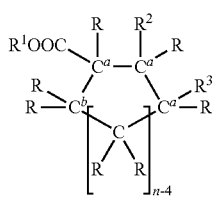

(1)

wherein n is an integer of 5 to 10, $R^2$ and $R^3$ are each independently $COOR^1$ or R, at least one of $R^2$ and $R^3$ is $COOR^1$, and single bonds (C—$C^b$ bond, $C^a$—$C^b$ bond in the case where $R^3$ is $COOR^1$, and C—C bond (in the case where n is 6 to 10)) in the cyclic skeleton may be each replaced with a double bond, each $R^1$ is independently a monovalent hydrocarbon group of 1 to 20 carbon atoms, plural R are each independently an atom or a group selected from a hydrogen atom, a hydrocarbon group of 1 to 20 carbon atoms, a halogen atom, a nitrogen-containing group, an oxygen-containing group, a phosphorus-containing group, a halogen-containing group and a silicon-containing group, and they may be bonded to one another to form a ring, but at least one R is not a hydrogen atom, in a skeleton of the ring formed from plural R bonded to one another, a double bond may be contained, and when two or more $C^a$ to each of which $COOR^1$ is bonded are contained in the skeleton of the ring, the number of carbon atoms to constitute the skeleton of the ring is in the range of 5 to 10;

[Chem. 2]

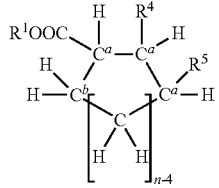

(2)

wherein n is an integer of 5 to 10, $R^4$ and $R^5$ are each independently $COOR^1$ or a hydrogen atom, at least one of $R^4$ and $R^5$ is $COOR^1$, each $R^1$ is independently a monovalent hydrocarbon group of 1 to 20 carbon atoms, and single bonds (C—$C^b$ bond, $C^a$—$C^b$ bond in the case where $R^5$ is $COOR^1$, and C—C bond (in the case where n is 6 to 10)) in the cyclic skeleton may be each replaced with a double bond.

In the formula (1) and the formula (2), it is preferable that all the bonds between carbon atoms in the cyclic skeleton are single bonds. In the formula (1) and the formula (2), it is also preferable that n is 6.

It is preferable that the cyclic ester compound (a) is represented by the following formula (1a), and the cyclic ester compound (b) is represented by the following formula (2a);

[Chem. 3]

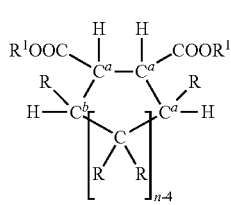

(1a)

wherein n is an integer of 5 to 10, single bonds (C—C bond (in the case where n is 6 to 10), $C^a$—C bond and $C^b$—C bond) in the cyclic skeleton may be each replaced with a double bond, each $R^1$ is independently a monovalent hydrocarbon group of 1 to 20 carbon atoms, plural R are each independently an atom or a group selected from a hydrogen atom, a hydrocarbon group of 1 to 20 carbon atoms, a halogen atom, a nitrogen-containing group, an oxygen-containing group, a phosphorus-containing group, a halogen-containing group and a silicon-containing group, and they may be bonded to one another to form a ring, but at least one R is not a hydrogen atom, in a skeleton of the ring formed from plural R bonded to one another, a double bond may be contained, and when two or more $C^a$ to each of which $COOR^1$ is bonded are contained in the skeleton of the ring, the number of carbon atoms to constitute the skeleton of the ring is in the range of 5 to 10;

[Chem. 4]

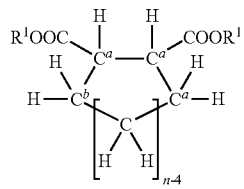

(2a)

wherein n is an integer of 5 to 10, each $R^1$ is independently a monovalent hydrocarbon group of 1 to 20 carbon atoms, and single bonds (C—C bond (in the case where n is 6 to 10), $C^a$—C bond and $C^b$—C bond) in the cyclic skeleton may be each replaced with a double bond.

In the formula (1a) and the formula (2a), it is preferable that all the bonds between carbon atoms in the cyclic skeleton are single bonds. In the formula (1a) and the formula (2a), it is also preferable that n is 6.

The propylene resin composition of the present invention comprises the above-mentioned propylene-based block copolymer, and an inorganic filler and/or an elastomer.

The molded product of the present invention comprises the above-mentioned propylene-based block copolymer.

Advantageous Effects of Invention

The propylene-based block copolymer of the present invention can achieve high melt viscoelasticity by virtue of an ultrahigh-molecular weight rubber component contained in a slight amount in the copolymer rubber of wide molecular weight distribution, even if fluidity of the propylene polymer of wide molecular weight distribution is increased. As a result, stabilization of in-mold flow during the injection molding can be achieved, and hence, an effect that flow mark hardly occurs is exerted. At the same time, an effect that the molded product rarely suffers surface appearance defects such as fish eye and graininess is exerted because it is unnecessary to increase a molecular weight of the whole copolymer rubber of wide molecular weight distribution in order to improve occurrence of flow mark.

Moreover, the propylene-based block copolymer of the present invention has, as a constitutional unit, a copolymer rubber of wide-molecular weight distribution containing a high-molecular weight rubber component, and hence, the glass transition temperature is lowered. By virtue of these properties, the propylene-based block copolymer of the present invention has an effect that it exhibits good low-temperature impact resistance.

Furthermore, by virtue of orientation crystallization of the wide-molecular weight distribution propylene polymer having high stereoregularity and wide molecular weight distribution, the propylene-based block copolymer of the present invention has an effect that this copolymer has high rigidity without impairing impact resistance.

In addition, by virtue of orientation crystallization of the propylene polymer having high stereoregularity and wide molecular weight distribution, the propylene-based block copolymer of the present invention has an effect that an injection molded product of this copolymer has a low linear expansion coefficient and has high dimensional accuracy.

Since the propylene-based block copolymer of the present invention has such effects as above, a composition containing the copolymer and molded products obtained therefrom can be used as materials of various molded articles having excellent properties, particularly large-sized injection molded articles such as automotive interior or exterior trim parts and household appliance parts.

DESCRIPTION OF EMBODIMENTS

Figure 1:
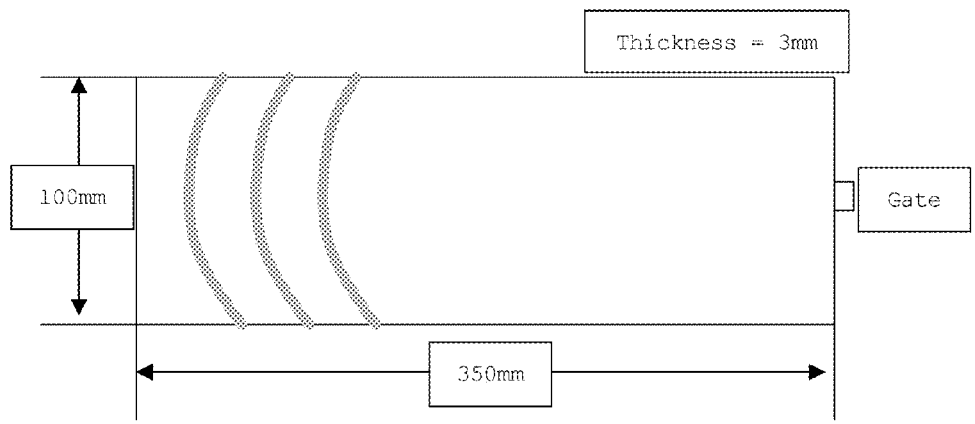
FIG. 1 is a schematic view of a molded article shape, which is used for visual evaluation of appearance flow mark of an injection molded article.

The propylene-based block copolymer of the present invention, the composition containing the copolymer and the molded products obtained therefrom are described in detail hereinafter.

Propylene-Based Block Copolymer

The propylene-based block copolymer of the present invention comprises 5 to 80% by weight, preferably 10 to 50% by weight, more preferably 10 to 30% by weight, of a room temperature n-decane-soluble portion (Dsol) and 20 to 95% by weight, preferably 50 to 90% by weight, more preferably 70 to 90% by weight, of a room temperature n-decane-insoluble portion (Dinsol), with the proviso that the total amount of the Dsol and the Dinsol is 100% by weight.

The room temperature n-decane-soluble portion (Dsol) contains, as a main component (larger than 50% by weight, preferably 80 to 100% by weight, more preferably 90 to 100% by weight), a propylene-based copolymer rubber comprising propylene and one or more olefins selected from ethylene and α-olefins of 4 to 20 carbon atoms. The content of one or more olefins selected from ethylene and α-olefins of 4 to 20 carbon atoms in the propylene-based copolymer rubber is higher than the content of the olefins in the later-described propylene-based polymer.

The room temperature n-decane-insoluble portion (Dinsol) contains, as a main component (larger than 50% by weight, preferably 80 to 100% by weight, more preferably 90 to 100% by weight), a crystalline propylene-based (co)polymer. The crystalline propylene-based (co)polymer is a crystalline propylene homopolymer or a crystalline propylene-based copolymer containing propylene and not more than 1.5% by mol of one or more olefins selected from ethylene and α-olefins of 4 to 20 carbon atoms.

The propylene-based block copolymer of the present invention satisfies the later-described requirements [1] to [3] at the same time, and preferably further satisfies the requirement [4] and/or the requirement [5] at the same time. In the present invention, the "room temperature n-decane-soluble portion (Dsol)" indicates a portion in the propylene-based block copolymer, which is being dissolved in n-decane after the copolymer is heated at 150° C. for 2 hours in n-decane to dissolve it and then cooled down to 23° C., as described in detail in the examples given later. In the following description, the "room temperature n-decane-soluble portion" and the "room temperature n-decane-insoluble portion" are sometimes called "n-decane-soluble portion" and "n-decane-insoluble portion" for short, respectively.

The propylene-based block copolymer of the present invention is constituted of a skeleton (as a main skeleton) attributable to propylene and a skeleton attributable to one or more olefins selected from ethylene and α-olefins of 4 to 20 carbon atoms. Examples of the α-olefins of 4 to 20 carbon atoms include 1-butene, 1-pentene, 1-hexene, 4-methyl-1-pentene, 1-octene, 1-decene, 1-dodecene, 1-tetradecene, 1-hexadecene, 1-octadecene and 1-eicosene. As the olefin to constitute the skeleton attributable to one or more olefins selected from ethylene and α-olefins of 4 to 20 carbon atoms in the copolymer, preferable is ethylene or an α-olefin of 4 to 10 carbon atoms, and more preferable is ethylene, 1-butene, 1-pentene, 1-hexcene, 4-methyl-1-pentene, 1-octene or 1-decene. It is still more preferable to use one or more kinds of these olefins.

The requirements [1] to [3] which the propylene-based block copolymer of the present invention should satisfy and the requirements [4] and [5] which the copolymer satisfies when needed are as follows.

[1] The molecular weight distribution (Mw/Mn) of the Dsol is not less than 7.0 but not more than 30.

[2] The molecular weight distribution (Mw/Mn) of the Dinsol is not less than 7.0 but not more than 30, and Mz/Mw thereof is not less than 6.0 but not more than 20.

[3] The pentad fraction (mmmm) of the Dinsol is not less than 93%.

[4] The intrinsic viscosity [η] (dl/g) of the Dsol is not less than 1.5 but not more than 10.0.

[5] Mz/Mn of the Dinsol is not less than 70 but not more than 300.

The requirements [1] to [5] of the propylene-based block copolymer of the present invention are described below in detail.

Requirement [1]

The Mw/Mn value of the decane-soluble portion (Dsol) in the propylene-based block copolymer of the present invention, which is a ratio of a weight-average molecular weight (Mw) to a number-average molecular weight (Mn) and determined from measured values given by gel permeation chromatography (GPC), is in the range of 6.0 to 30, and from the viewpoint of compatibility of high fluidity with high melt tension, it is preferably in the range of 6.5 to 20, more preferably 7.0 to 18.

Since the Mw/Mn of the decane-soluble portion (Dsol) in the propylene-based block copolymer of the present invention is high, this copolymer is characterized by containing a large amount of a high-molecular weight copolymer rubber component. Owing to such a characteristic, melt elasticity of the propylene-based block copolymer of the present invention can be increased by the high-molecular weight copolymer rubber component even if MFR of the propylene-based polymer of wide-molecular weight distribution is high. Therefore, such a high Mw/Mn value is advantageous in attaining compatibility of high fluidity with high melt tension.

When the fluidity of the propylene-based block copolymer is high, injection molding to produce large-sized products and shortening of injection molding cycle are possible. When the melt elasticity of the propylene-based block copolymer is high, appearance of injection molded articles becomes good, and blow molding properties or foam molding properties become good, that is, impartation of molding processability to the copolymer becomes possible.

The requirement [1] can be attained by copolymerizing propylene and one or more olefins selected from ethylene and α-olefins of 4 to 20 carbon atoms in the presence of the later-described olefin polymerization catalyst.

The requirement [1] can be attained by carrying out the polymerization in plural stages even if an olefin polymerization catalyst already known is used, but in the present invention, by the use of the later-described olefin polymerization catalyst, it becomes possible to obtain a copolymer satisfying the desired requirement even in the polymerization of one stage. By virtue of this, there is an advantage that the resulting copolymer rubber component is not aggregated and is apt to be more finely dispersed in the propylene-based block copolymer. Moreover, simpler polymer production apparatus can be used, and this is advantageous from the viewpoints of economy and energy saving. The "polymerization of one stage" used herein means that the step for producing the copolymer rubber is made up by a stage of one reactor and the polymerization conditions in the reactor are not changed at all.

Requirement [2]

The Mw/Mn value of the decane-insoluble portion (Dinsol) in the propylene-based block copolymer of the present invention, as determined from measured values given by gel permeation chromatography (GPC), is in the range of 7.0 to 30, and from the viewpoint of retention of high rigidity and impact resistance, the Mw/Mn value is preferably in the range of 7.0 to 20, more preferably 8.0 to 18.

The Mz/Mw value of the decane-insoluble portion (Dinsol) in the propylene-based block copolymer of the present invention, as determined from measured values given by gel permeation chromatography (GPC), is in the range of 6 to 20, preferably 6.5 to 18, more preferably 7 to 15.

Since the decane-insoluble portion (Dinsol) in the propylene-based block copolymer of the present invention has a high Mw/Mn value, the copolymer exhibits a sufficiently wide molecular weight distribution and is excellent not only in moldability but also in rigidity. Further, since the decane-insoluble portion has a high Mz/Mw value as described above, the propylene-based block copolymer of the present invention contains a large amount of a high-molecular weight component, so that the propylene-based block copolymer has high melt tension (MT) and excellent moldability.

Such a decane-insoluble portion (Dinsol) in the propylene-based block copolymer of the present invention as above can be prepared by polymerization of plural stages or mixing of plural kinds of polypropylenes, but it is preferable to obtain it by polymerization of one stage. When the decane-insoluble portion (Dinsol) of the propylene-based block copolymer of the present invention is obtained by polymerization of one stage, a simpler polymer production apparatus can be used, and this is economical. Moreover, the high-molecular weight component is not aggregated and is more finely dispersed in the propylene-based block copolymer, so that polymerization of one stage is preferable.

The decane-insoluble portion (Dinsol) in the propylene-based block copolymer of the present invention has a high Mw/Mn value and contains a large amount of a high-molecular weight component having a high Mz/Mw value and preferably further having a high Mz/Mn value that is described later. Therefore, the high-molecular weight component in the propylene-based block copolymer functions as a nucleating agent in the molding process, and even if a nucleating agent such as a filler powder or a resin powder is not added, a molded product having a high crystallinity can be sometimes obtained. Especially when the high-molecular weight component is finely dispersed, the function of the nucleating agent tends to be enhanced, so that such a case is preferable.

The requirement [2] can be attained by polymerizing 98.5 to 100% by mol of propylene and 0 to 1.5% by mol of one or more olefins selected from ethylene and α-olefins of 4 to 20 carbon atoms in the presence of the later-described olefin polymerization catalyst.

Requirement [3]

The pentad fraction (mmmm) of the decane-insoluble portion (Dinsol) in the propylene-based block copolymer of the present invention is not less than 93%, preferably not less than 94%, more preferably not less than 95%. The upper limit of the pentad fraction is 100%, preferably 99.8%, more preferably 99.5%. A pentad fraction (mmmm) of less than 93% is undesirable because rigidity is lowered, or in some fields of products such as films, heat resistance required cannot be occasionally secured.

For example, in a propylene-based polymer produced by the use of a titanium trichloride catalyst, the decane-insoluble portion has an extremely low pentad fraction of about 91 to 92% though an effect attributable to widening of a molecular weight distribution is exerted, as described in the aforesaid patent literature 5, and therefore, such a polymer cannot be used for injection molded products requiring high rigidity, such as automotive materials.

That the requirement [3] is satisfied is attributable to the fact that a cyclic ester compound (a) and a cyclic ester compound (b) are contained as electron donors in the later-described olefin polymerization catalyst.

Requirement [4]

The intrinsic viscosity [η] (dl/g) of the decane-soluble portion (Dsol) in the propylene-based block copolymer of the present invention is usually in the range of 1.5 to 10.0, and from the viewpoint of optimization of a balance among impact resistance, high fluidity and high melt elasticity, it is preferably in the range of 2.0 to 7.0, more preferably 2.5 to 4.0. An intrinsic viscosity [η] (dl/g) of less than 1.5 dl/g is undesirable because impact resistance of the propylene-based block copolymer is liable to be lowered. If the intrinsic viscosity [η] (dl/g) is higher than 10 dl/g, fluidity is liable to be lowered or fish eye is apt to occur, and hence, application to large-sized injected molded articles or films sometimes becomes difficult.

It has been considered to be a matter of common knowledge by a person skilled in the art that the effects such as impact resistance, high fluidity and high melt elasticity can be exerted by post addition of a propylene-based copolymer rubber having a high intrinsic viscosity [η] (dl/g) of the decane-soluble portion (Dsol). In this case, however, there is a problem that fish eye is apt to occur, and from the viewpoint of deterioration of molded article appearance, industrialization is difficult. On the other hand, in the case of a propylene-based block copolymer obtained by continuously polymerizing the decane-soluble portion (Dsol) as in the present invention, the copolymer rubber is finely dispersed in the whole copolymer. Therefore, such a defect as above does not occur, and in addition to the above effects such as impact resistance, high fluidity and high melt elasticity of the copolymer, molded articles inhibited from occurrence of fish eye can be obtained.

Requirement [5]

The Mz/Mn value of the decane-insoluble portion (Dinsol) in the polypropylene-based block copolymer of the present invention is in the range of 70 to 300, preferably 100 to 250, more preferably 120 to 200.

Polypropylene having a high Mz/Mn value indicates that the content of the high-molecular weight component is high, and the polypropylene is expected to have high possibilities of high melt tension and excellent moldability and rigidity.

A propylene-based polymer produced by the use of, for example, a titanium trichloride catalyst has an effect attributable to widening of a molecular weight distribution, as described in the aforesaid patent literature 5, but the widening of a molecular weight distribution greatly depends upon increase of a low-molecular weight polymer, so that the Mz/Mn value of the propylene-based polymer produced by the use of a titanium trichloride catalyst is at most about 40. Accordingly, the propylene-based polymer is unsuitable for injection molded products such as automotive materials, which require an effect attributable to a large amount of a high-molecular weight polymer as in the present invention, namely, high rigidity.

The propylene-based block copolymer satisfying the above requirements [1] to [3] at the same time, more preferably further satisfying the requirements [4] and [5], is preferably prepared by the use of the following olefin polymerization catalyst.

Olefin Polymerization Catalyst

The propylene-based block copolymer of the present invention is preferably obtained by polymerization in the presence of an olefin polymerization catalyst comprising a solid titanium catalyst component (I), an organometallic compound (II) containing a metal atom selected from Group 1, Group 2 and Group 13 of the periodic table, and if necessary, an electron donor (III). The components of the olefin polymerization catalyst are described below in detail.

Solid Titanium Catalyst Component (I)

The solid titanium catalyst component (I) for the present invention contains titanium, magnesium, halogen, a cyclic ester compound (a) represented by the following formula (1) and a cyclic ester compound (b) represented by the following formula (2).

Cyclic Ester Compound (a)

The cyclic ester compound (a) has plural carboxylic acid ester groups and is represented by the following formula (1).

[Chem. 5]

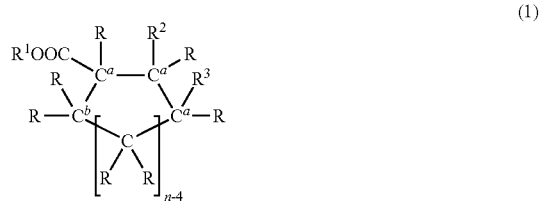

(1)

In the formula (1), n is an integer of 5 to 10, preferably an integer of 5 to 7, particularly preferably 6. $C^a$ and $C^b$ are each a carbon atom.

$R^2$ and $R^3$ are each independently $COOR^1$ or R, and at least one of $R^2$ and $R^3$ is $COOR^1$.

All the bonds between carbon atoms in the cyclic skeleton are preferably single bonds, but any of single bonds in the cyclic skeleton, other than $C^a$—$C^a$ bond and $C^a$—$C^b$ bond in the case where $R^3$ is R, may be replaced with a double bond.

That is to say, C—C$^b$ bond, C$^{a-Cb}$ bond in the case where R$^3$ is COOR$^1$, and C—C bond (in the case where n is 6 to 10) in the cyclic skeleton may be each replaced with a double bond.

Plural R$^1$ are each independently a monovalent hydrocarbon group of 1 to 20 carbon atoms, preferably 1 to 10 carbon atoms, more preferably 2 to 8 carbon atoms, still more preferably 4 to 8 carbon atoms, particularly preferably 4 to 6 carbon atoms. Examples of the hydrocarbon groups include methyl group, ethyl group, n-propyl group, isopropyl group, n-butyl group, isobutyl group, hexyl group, heptyl group, octyl group, 2-ethylhexyl group, decyl group, dodecyl group, tetradecyl group, hexadecyl group, octadecyl group and eicosyl group. Of these, n-butyl group, isobutyl group, hexyl group and octyl group are preferable, and n-butyl group and isobutyl group are particularly preferable because a propylene-based block copolymer having a wide molecular weight distribution can be prepared.

Plural R are each independently an atom or a group selected from a hydrogen atom, a hydrocarbon group of 1 to 20 carbon atoms, a halogen atom, a nitrogen-containing group, an oxygen-containing group, a phosphorus-containing group, a halogen-containing group and a silicon-containing group, but at least one R is not a hydrogen atom.

R other than a hydrogen atom is preferably a hydrocarbon group of 1 to 20 carbon atoms among them, and examples of the hydrocarbon groups of 1 to 20 carbon atoms include aliphatic hydrocarbon groups, alicyclic hydrocarbon groups and aromatic hydrocarbon groups, such as methyl group, ethyl group, n-propyl group, isopropyl group, n-butyl group, isobutyl group, sec-butyl group, n-pentyl group, cyclopentyl group, n-hexyl group, cyclohexyl group, vinyl group, phenyl group and octyl group. Of these, aliphatic hydrocarbon groups are preferable, and specifically, methyl group, ethyl group, n-propyl group, isopropyl group, n-butyl group, isobutyl group and sec-butyl group are preferable.

Moreover, plural R may be bonded to one another to form a ring, and in the skeleton of the ring formed from plural R bonded to one another, a double bond may be contained. When two or more C$^a$ to each of which COOR$^1$ is bonded are contained in the skeleton of the ring, the number of carbon atoms to constitute the skeleton of the ring is in the range of 5 to 10.

Examples of such skeletons of the rings include norbornane skeleton and tetracyclododecene skeleton.

Furthermore, plural R may be each a carbonyl structure-containing group, such as carbonic acid ester group, alkoxy group, siloxy group, aldehyde group or acetyl group, and in these substituents, one or more hydrocarbon groups of 1 to 20 carbon atoms are preferably contained.

Such a cyclic ester compound (a) is described in International Publication No. 2006/077945 pamphlet. Examples of such compounds include:

diethyl 3-methylcyclohexane-1,2-dicarboxylate,
di-n-propyl 3-methylcyclohexane-1,2-dicarboxylate,
diisopropyl 3-methylcyclohexane-1,2-dicarboxylate,
di-n-butyl 3-methylcyclohexane-1,2-dicarboxylate,
diisobutyl 3-methylcyclohexane-1,2-dicarboxylate,
dihexyl 3-methylcyclohexane-1,2-dicarboxylate,
diheptyl 3-methylcyclohexane-1,2-dicarboxylate,
dioctyl 3-methylcyclohexane-1,2-dicarboxylate,
di-2-ethylhexyl 3-methylcyclohexane-1,2-dicarboxylate,
didecyl 3-methylcyclohexane-1,2-dicarboxylate,
diethyl 4-methylcyclohexane-1,3-dicarboxylate,
diisobutyl 4-methylcyclohexane-1,3-dicarboxylate,
diethyl 4-methylcyclohexane-1,2-dicarboxylate,
di-n-propyl 4-methylcyclohexane-1,2-dicarboxylate,
diisopropyl 4-methylcyclohexane-1,2-dicarboxylate,
di-n-butyl 4-methylcyclohexane-1,2-dicarboxylate,
diisobutyl 4-methylcyclohexane-1,2-dicarboxylate,
dihexyl 4-methylcyclohexane-1,2-dicarboxylate,
diheptyl 4-methylcyclohexane-1,2-dicarboxylate,
dioctyl 4-methylcyclohexane-1,2-dicarboxylate,
di-2-ethylhexyl 4-methylcyclohexane-1,2-dicarboxylate,
didecyl 4-methylcyclohexane-1,2-dicarboxylate,
diethyl 5-methylcyclohexane-1,3-dicarboxylate,
diisobutyl 5-methylcyclohexane-1,3-dicarboxylate,
diethyl 3,4-dimethylcyclohexane-1,2-dicarboxylate,
di-n-propyl 3,4-dimethylcyclohexane-1,2-dicarboxylate,
diisopropyl 3,4-dimethylcyclohexane-1,2-dicarboxylate,
di-n-butyl 3,4-dimethylcyclohexane-1,2-dicarboxylate,
diisobutyl 3,4-dimethylcyclohexane-1,2-dicarboxylate,
dihexyl 3,4-dimethylcyclohexane-1,2-dicarboxylate,
diheptyl 3,4-dimethylcyclohexane-1,2-dicarboxylate,
dioctyl 3,4-dimethylcyclohexane-1,2-dicarboxylate,
di-2-ethylhexyl 3,4-dimethylcyclohexane-1,2-dicarboxylate,
didecyl 3,4-dimethylcyclohexane-1,2-dicarboxylate,
diethyl 3,6-dimethylcyclohexane-1,2-dicarboxylate,
di-n-propyl 3,6-dimethylcyclohexane-1,2-dicarboxylate,
diisopropyl 3,6-dimethylcyclohexane-1,2-dicarboxylate,
di-n-butyl 3,6-dimethylcyclohexane-1,2-dicarboxylate,
diisobutyl 3,6-dimethylcyclohexane-1,2-dicarboxylate,
dihexyl 3,6-dimethylcyclohexane-1,2-dicarboxylate,
diheptyl 3,6-dimethylcyclohexane-1,2-dicarboxylate,
dioctyl 3,6-dimethylcyclohexane-1,2-dicarboxylate,
di-2-ethylhexyl 3,6-dimethylcyclohexane-1,2-dicarboxylate,
didecyl 3,6-dimethylcyclohexane-1,2-dicarboxylate,
diethyl 3,6-diphenylcyclohexane-1,2-dicarboxylate,
di-n-propyl 3,6-diphenylcyclohexane-1,2-dicarboxylate,
diisopropyl 3,6-diphenylcyclohexane-1,2-dicarboxylate,
di-n-butyl 3,6-diphenylcyclohexane-1,2-dicarboxylate,
diisobutyl 3,6-diphenylcyclohexane-1,2-dicarboxylate,
dihexyl 3,6-diphenylcyclohexane-1,2-dicarboxylate,
dioctyl 3,6-diphenylcyclohexane-1,2-dicarboxylate,
didecyl 3,6-diphenylcyclohexane-1,2-dicarboxylate,
diethyl 3-methyl-6-ethylcyclohexane-1,2-dicarboxylate,
di-n-propyl 3-methyl-6-ethylcyclohexane-1,2-dicarboxylate,
diisopropyl 3-methyl-6-ethylcyclohexane-1,2-dicarboxylate,
di-n-butyl 3-methyl-6-ethylcyclohexane-1,2-dicarboxylate,
diisobutyl 3-methyl-6-ethylcyclohexane-1,2-dicarboxylate,
dihexyl 3-methyl-6-ethylcyclohexane-1,2-dicarboxylate,
diheptyl 3-methyl-6-ethylcyclohexane-1,2-dicarboxylate,
dioctyl 3-methyl-6-ethylcyclohexane-1,2-dicarboxylate,
di-2-ethylhexyl 3-methyl-6-ethylcyclohexane-1,2-dicarboxylate,
didecyl 3-methyl-6-ethylcyclohexane-1,2-dicarboxylate,
diethyl 3-methyl-6-ethylcyclohexane-1,2-dicarboxylate,
di-n-propyl 3-methyl-6-ethylcyclohexane-1,2-dicarboxylate,
diisopropyl 3-methyl-6-ethylcyclohexane-1,2-dicarboxylate,
di-n-butyl 3-methyl-6-ethylcyclohexane-1,2-dicarboxylate,
diisobutyl 3-methyl-6-ethylcyclohexane-1,2-dicarboxylate,
dihexyl 3-methyl-6-ethylcyclohexane-1,2-dicarboxylate,
diheptyl 3-methyl-6-ethylcyclohexane-1,2-dicarboxylate,
dioctyl 3-methyl-6-ethylcyclohexane-1,2-dicarboxylate,
di-2-ethylhexyl 3-methyl-6-ethylcyclohexane-1,2-dicarboxylate,
didecyl 3-methyl-6-ethylcyclohexane-1,2-dicarboxylate,
diethyl 3-methyl-6-n-propylcyclohexane-1,2-dicarboxylate,
di-n-propyl 3-methyl-6-n-propylcyclohexane-1,2-dicarboxylate,
diisopropyl 3-methyl-6-n-propylcyclohexane-1,2-dicarboxylate,
di-n-butyl 3-methyl-6-n-propylcyclohexane-1,2-dicarboxylate,
diisobutyl 3-methyl-6-n-propylcyclohexane-1,2-dicarboxylate,
dihexyl 3-methyl-6-n-propylcyclohexane-1,2-dicarboxylate,
diheptyl 3-methyl-6-n-propylcyclohexane-1,2-dicarboxylate,
dioctyl 3-methyl-6-n-propylcyclohexane-1,2-dicarboxylate,
di-2-ethylhexyl 3-methyl-6-n-propylcyclohexane-1,2-dicarboxylate,
didecyl 3-methyl-6-n-propylcyclohexane-1,2-dicarboxylate,
diethyl 3-hexylcyclohexane-1,2-dicarboxylate,
diisobutyl 3-hexylcyclohexane-1,2-dicarboxylate,
diethyl 3,6-dihexylcyclohexane-1,2-dicarboxylate,
diisobutyl 3-hexyl-6-pentylcyclohexane-1,2-dicarboxylate,
diethyl 3-methylcyclopentane-1,2-dicarboxylate,
diisobutyl 3-methylcyclopentane-1,2-dicarboxylate,
diheptyl 3-methylcyclopentane-1,2-dicarboxylate,
didecyl 3-methylcyclopentane-1,2-dicarboxylate,
diethyl 4-methylcyclopentane-1,3-dicarboxylate,
diisobutyl 4-methylcyclopentane-1,3-dicarboxylate,
diethyl 4-methylcyclopentane-1,2-dicarboxylate,
diisobutyl 4-methylcyclopentane-1,2-dicarboxylate,
diheptyl 4-methylcyclopentane-1,2-dicarboxylate,
didecyl 4-methylcyclopentane-1,2-dicarboxylate,
diethyl 5-methylcyclopentane-1,3-dicarboxylate,
diisobutyl 5-methylcyclopentane-1,3-dicarboxylate,
diethyl 3,4-dimethylcyclopentane-1,2-dicarboxylate,
diisobutyl 3,4-dimethylcyclopentane-1,2-dicarboxylate,
diheptyl 3,4-dimethylcyclopentane-1,2-dicarboxylate,
didecyl 3,4-dimethylcyclopentane-1,2-dicarboxylate,
diethyl 3,5-dimethylcyclopentane-1,2-dicarboxylate,
diisobutyl 3,5-dimethylcyclopentane-1,2-dicarboxylate,
diheptyl 3,5-dimethylcyclopentane-1,2-dicarboxylate,
didecyl 3,5-dimethylcyclopentane-1,2-dicarboxylate,
diethyl 3-hexylcyclopentane-1,2-dicarboxylate,
diethyl 3,5-dihexylcyclopentane-1,2-dicarboxylate,
diisobutyl 3-hexyl-5-pentylcyclopentane-1,2-dicarboxylate,
diethyl 3-methyl-5-n-propylcyclopentane-1,2-dicarboxylate,
di-n-propyl 3-methyl-5-n-propylcyclopentane-1,2-dicarboxylate,
diisopropyl 3-methyl-5-n-propylcyclopentane-1,2-dicarboxylate,
di-n-butyl 3-methyl-5-n-propylcyclopentane-1,2-dicarboxylate,
diisobutyl 3-methyl-5-n-propylcyclopentane-1,2-dicarboxylate,
dihexyl 3-methyl-5-n-propylcyclopentane-1,2-dicarboxylate,
dioctyl 3-methyl-5-n-propylcyclopentane-1,2-dicarboxylate,
didecyl 3-methyl-5-n-propylcyclopentane-1,2-dicarboxylate,
diethyl 3-methylcycloheptane-1,2-dicarboxylate,
diisobutyl 3-methylcycloheptane-1,2-dicarboxylate,
diheptyl 3-methylcycloheptane-1,2-dicarboxylate,
didecyl 3-methylcycloheptane-1,2-dicarboxylate,
diethyl 4-methylcycloheptane-1,3-dicarboxylate,
diisobutyl 4-methylcycloheptane-1,3-dicarboxylate,
diethyl 4-methylcycloheptane-1,2-dicarboxylate,
diisobutyl 4-methylcycloheptane-1,2-dicarboxylate,
diheptyl 4-methylcycloheptane-1,2-dicarboxylate,
didecyl 4-methylcycloheptane-1,2-dicarboxylate,
diethyl 5-methylcycloheptane-1,3-dicarboxylate,
diisobutyl 5-methylcycloheptane-1,3-dicarboxylate,
diethyl 3,4-dimethylcycloheptane-1,2-dicarboxylate,
diisobutyl 3,4-dimethylcycloheptane-1,2-dicarboxylate,
diheptyl 3,4-dimethylcycloheptane-1,2-dicarboxylate,
didecyl 3,4-dimethylcycloheptane-1,2-dicarboxylate,
diethyl 3,7-dimethylcycloheptane-1,2-dicarboxylate,
diisobutyl 3,7-dimethylcycloheptane-1,2-dicarboxylate,
diheptyl 3,7-dimethylcycloheptane-1,2-dicarboxylate,
didecyl 3,7-dimethylcycloheptane-1,2-dicarboxylate,
diethyl 3-hexylcycloheptane-1,2-dicarboxylate,
diethyl 3,7-dihexylcycloheptane-1,2-dicarboxylate,
diisobutyl 3-hexyl-7-pentylcycloheptane-1,2-dicarboxylate,
diethyl 3-methyl-7-n-propylcycloheptane-1,2-dicarboxylate,
di-n-propyl 3-methyl-7-n-propylcycloheptane-1,2-dicarboxylate,
diisopropyl 3-methyl-7-n-propylcycloheptane-1,2-dicarboxylate,
di-n-butyl 3-methyl-7-n-propylcycloheptane-1,2-dicarboxylate,
diisobutyl 3-methyl-7-n-propylcycloheptane-1,2-dicarboxylate,
dihexyl 3-methyl-7-n-propylcycloheptane-1,2-dicarboxylate,
dioctyl 3-methyl-7-n-propylcycloheptane-1,2-dicarboxylate,
didecyl 3-methyl-7-n-propylcycloheptane-1,2-dicarboxylate,
diethyl 3-methylcyclooctane-1,2-dicarboxylate,
diethyl 3-methylcyclodecane-1,2-dicarboxylate,
diisobutyl 3-vinylcyclohexane-1,2-dicarboxylate,
diisobutyl 3,6-diphenylcyclohexane-1,2-dicarboxylate,
diethyl 3,6-dicyclohexylcyclohexane-1,2-dicarboxylate,
diisobutyl norbornane-2,3-dicarboxylate,
diisobutyl tetracyclododecane-2,3-dicarboxylate,
diethyl 3,6-dimethyl-4-cyclohexene-1,2-dicarboxylate,
di-n-propyl 3,6-dimethyl-4-cyclohexene-1,2-dicarboxylate,
diisopropyl 3,6-dimethyl-4-cyclohexene-1,2-dicarboxylate,
di-n-butyl 3,6-dimethyl-4-cyclohexene-1,2-dicarboxylate,
diisobutyl 3,6-dimethyl-4-cyclohexene-1,2-dicarboxylate,
dihexyl 3,6-dimethyl-4-cyclohexene-1,2-dicarboxylate,
diheptyl 3,6-dimethyl-4-cyclohexene-1,2-dicarboxylate,
dioctyl 3,6-dimethyl-4-cyclohexene-1,2-dicarboxylate,
di-2-ethylhexyl 3,6-dimethyl-4-cyclohexene-1,2-dicarboxylate,
didecyl 3,6-dimethyl-4-cyclohexene-1,2-dicarboxylate,
diethyl 3,6-dihexyl-4-cyclohexene-1,2-dicarboxylate, and
diisobutyl 3-hexyl-6-pentyl-4-cyclohexene-1,2-dicarboxylate.

As preferred examples, there can be also mentioned the following compounds:
3,6-dimethylcyclohexane-1,2-diacetate,
3,6-dimethylcyclohexane-1,2-dibutanate, 3-methyl-6-propylcyclohexane-1,2-diol acetate,
3-methyl-6-propylcyclohexane-1,2-butanate,
3,6-dimethylcylohexane-1,2-dibenzoate,
3,6-dimethylcyclohexane-1,2-ditoluate,
3-methyl-6-propylcyclohexane-1,2-dibenzoate,
3-methyl-6-propylcyclohexane-1,2-ditoluate, etc.

In such compounds having a diester structure as above, isomers such as cis and trans isomers derived from plural COOR$^1$ groups in the formula (1) are present, and any structure of the isomers has an effect which agrees with the object of the present invention, but a higher content of the trans isomer is preferable. When the content of the trans isomer is higher, not only an effect of widening a molecular weight distribution is exerted but also activity and stereoregularity of the resulting polymer tend to become higher.

As the cyclic ester compounds (a), compounds represented by the following formulas (1-1) to (1-6) are preferable.

[Chem. 6]

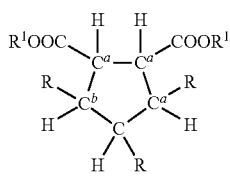
(1-1)

[Chem. 7]

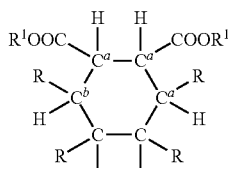
(1-2)

[Chem. 8]

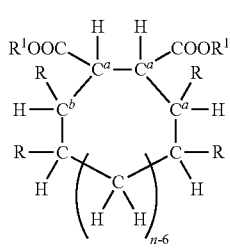
(1-3)

[Chem. 9]

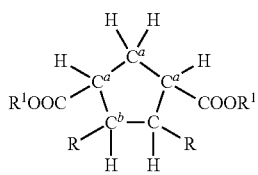
(1-4)

[Chem. 10]

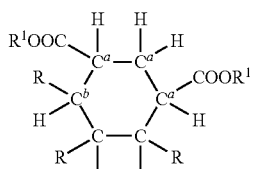
(1-5)

[Chem. 11]

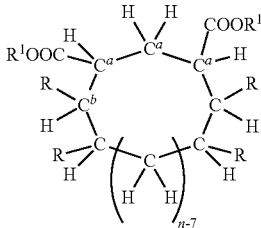
(1-6)

Definitions of R$^1$ and R in the formulas (1-1) to (1-6) are the same as those in the formula (1).

In the formulas (1-1) to (1-3), single bonds in the cyclic skeleton (excluding C$^a$—C$^a$ bond and C$^a$—C$^b$ bond) may be each replaced with a double bond.

In the formulas (1-4) to (1-6), single bonds in the cyclic skeleton (excluding C$^a$—C$^a$ bond) may be each replaced with a double bond.

In the formulas (1-3) and (1-6), n is an integer of 7 to 10.

As the cyclic ester compound (a), a compound represented by the following formula (1a) is particularly preferable.

[Chem. 12]

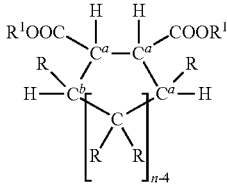
(1a)

Definitions of n, R$^1$ and R in the formula (1a) are the same as those in the formula (1), and single bonds in the cyclic skeleton (excluding C$^a$—C$^a$ bond and C$^a$—C$^b$ bond) may be each replaced with a double bond. That is to say, C—C bond (in the case where n is 6 to 10), C$^a$—C bond and C$^b$—C bond in the cyclic skeleton may be each replaced with a double bond.

Examples of the compounds represented by the formula (1a) include:
diisobutyl 3,6-dimethylcyclohexane-1,2-dicarboxylate,
di-n-hexyl 3,6-dimethylcyclohexane-1,2-dicarboxylate,
di-n-octyl 3,6-dimethylcyclohexane-1,2-dicarboxylate,
diisobutyl 3-methyl-6-ethylcyclohexane-1,2-dicarboxylate,
di-n-hexyl 3-methyl-6-ethylcyclohexane-1,2-dicarboxylate,
di-n-octyl 3-methyl-6-ethylcyclohexane-1,2-dicarboxylate,
diisobutyl 3-methyl-6-n-propylcyclohexane-1,2-dicarboxylate,
di-n-hexyl 3-methyl-6-n-propylcyclohexane-1,2"-dicarboxylate,
di-n-octyl 3-methyl-6-n-propylcyclohexane-1,2-dicarboxylate,
diisobutyl 3,6-diethylcyclohexane-1,2-dicarboxylate,
di-n-hexyl 3,6-diethylcyclohexane-1,2-dicarboxylate,
di-n-octyl 3,6-diethylcyclohexane-1,2-dicarboxylate,
diisobutyl 3,5-dimethylcyclopentane-1,2-dicarboxylate,
di-n-hexyl 3,5-dimethylcyclopentane-1,2-dicarboxylate, di-n-octyl 3,5-dimethylcyclopentane-1,2-dicarboxylate,
diisobutyl 3-methyl-5-ethylcyclopentane-1,2-dicarboxylate,
di-n-hexyl 3-methyl-5-ethylcyclopentane-1,2-dicarboxylate,
di-n-octyl 3-methyl-5-ethylcyclopentane-1,2-dicarboxylate,
di-n-hexyl 3-methyl-5-n-propylcyclopentane-1,2-dicarboxylate,
di-n-octyl 3-methyl-5-n-propylcyclopentane-1,2-dicarboxylate,
diisobutyl 3,5-diethylcyclopentane-1,2-dicarboxylate,
di-n-hexyl 3,5-diethylcyclopentane-1,2-dicarboxylate,
di-n-octyl 3,5-diethylcyclopentane-1,2-dicarboxylate,
diisobutyl 3,7-dimethylcycloheptane-1,2-dicarboxylate,
di-n-hexyl 3,7-dimethylcycloheptane-1,2-dicarboxylate,
di-n-octyl 3,7-dimethylcycloheptane-1,2-dicarboxylate,
diisobutyl 3-methyl-7-ethylcycloheptane-1,2-dicarboxylate,
di-n-hexyl 3-methyl-7-ethylcycloheptane-1,2-dicarboxylate,
di-n-octyl 3-methyl-7-ethylcycloheptane-1,2-dicarboxylate,
di-n-hexyl 3-methyl-7-ethylcycloheptane-1,2-dicarboxylate,
di-n-octyl 3-methyl-7-n-propylcycloheptane-1,2-dicarboxylate,
3-methyl-7-n-propylcycloheptane-1,2-dicarboxylate,
diisobutyl 3,7-diethylcycloheptane-1,2-dicarboxylate,
di-n-hexyl 3,7-diethylcycloheptane-1,2-dicarboxylate, and
di-n-octyl 3,7-diethylcycloheptane-1,2-dicarboxylate.

Of the above compounds, more preferable are:
diisobutyl 3,6-dimethylcyclohexane-1,2-dicarboxylate,
di-n-hexyl 3,6-dimethylcyclohexane-1,2-dicarboxylate,
di-n-octyl 3,6-dimethylcyclohexane-1,2-dicarboxylate,
diisobutyl 3-methyl-6-ethylcyclohexane-1,2-dicarboxylate,
di-n-hexyl 3-methyl-6-ethylcyclohexane-1,2-dicarboxylate,
di-n-octyl 3-methyl-6-ethylcyclohexane-1,2-dicarboxylate,
diisobutyl 3-methyl-6-ethylcyclohexane-1,2-dicarboxylate,
di-n-hexyl 3-methyl-6-n-propylcyclohexane-1,2-dicarboxylate,
di-n-octyl 3-methyl-6-n-propylcyclohexane-1,2-dicarboxylate,
3-methyl-6-n-propylcyclohexane-1,2-dicarboxylate,
diisobutyl 3,6-diethylcyclohexane-1,2-dicarboxylate,
di-n-hexyl 3,6-diethylcyclohexane-1,2-dicarboxylate, and
di-n-octyl 3,6-diethylcyclohexane-1,2-dicarboxylate.

These compounds can be prepared by utilizing the Diels-Alder reaction.

In such cyclic ester compounds (a) having a diester structure as above, isomers such as cis and trans isomers are present, and any structure of the isomers has an effect which agrees with the object of the present invention, but a higher content of the trans isomer is particularly preferable because not only an effect of widening a molecular weight distribution is exerted but also activity and stereoregularity of the resulting polymer tend to become higher. In the cis and trans isomers, the proportion of the trans isomer is preferably not less than 51%. The lower limit is more preferably 55%, still more preferably 60%, particularly preferably 65%. On the other hand, the upper limit is preferably 100%, more preferably 90%, still more preferably 85%, particularly preferably 79%.

Cyclic Ester Compound (b)

The cyclic ester compound (b) has plural carboxylic acid ester groups and is represented by the following formula (2).

[Chem. 13]

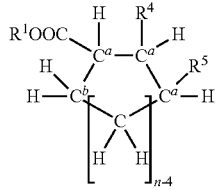

(2)

In the formula (2), n is an integer of 5 to 10, preferably an integer of 5 to 7, particularly preferably 6. $C^a$ and $C^b$ are each a carbon atom.

All the bonds between carbon atoms in the cyclic skeleton are preferably single bonds, but any of single bonds in the cyclic skeleton, other than $C^a$—$C^a$ bond and $C^a$—$C^b$ bond in the case where $R^5$ is a hydrogen atom, may be replaced with a double bond. That is to say, $C^a$—$C^a$ bond, $C^a$—$C^b$ bond in the case where $R^5$ is $COOR^1$ and C—C bond (in the case where n is 6 to 10) in the cyclic skeleton may be each replaced with a double bond.

$R^4$ and $R^5$ are each independently $COOR^1$ or a hydrogen atom, at least one of $R^4$ and $R^5$ is $COOR^1$, and each $R^1$ is independently a monovalent hydrocarbon group of 1 to 20 carbon atoms.

Plural $R^1$ are each independently a monovalent hydrocarbon group of 1 to 20 carbon atoms, preferably 1 to 10 carbon atoms, more preferably 2 to 8 carbon atoms, still more preferably 4 to 8 carbon atoms, particularly preferably 4 to 6 carbon atoms. Examples of the hydrocarbon groups include methyl group, ethyl group, n-propyl group, isopropyl group, n-butyl group, isobutyl group, hexyl group, heptyl group, octyl group, 2-ethylhexyl group, decyl group, dodecyl group, tetradecyl group, hexadecyl group, octadecyl group and eicosyl group. Of these, n-butyl group, isobutyl group, hexyl group and octyl group are preferable, and n-butyl group and isobutyl group are particularly preferable because a propylene-based block copolymer having a wide molecular weight distribution can be prepared.

Examples of such cyclic ester compounds (b) include:
diethyl cyclohexane-1,2-dicarboxylate,
di-n-propyl cyclohexane-1,2-dicarboxylate,
diisopropyl cyclohexane-1,2-dicarboxylate,
di-n-butyl cyclohexane-1,2-dicarboxylate,
diisobutyl cyclohexane-1,2-dicarboxylate,
dihexyl cyclohexane-1,2-dicarboxylate,
diheptyl cyclohexane-1,2-dicarboxylate,
dioctyl cyclohexane-1,2-dicarboxylate,
di-2-ethylhexyl cyclohexane-1,2-dicarboxylate,
didecyl cyclohexane-1,2-dicarboxylate,
diethyl cyclohexane-1,3-dicarboxylate,
diisobutyl cyclohexane-1,3-dicarboxylate,
diethyl cyclopentane-1,2-dicarboxylate,
diisopropyl cyclopentane-1,2-dicarboxylate,
diisobutyl cyclopentane-1,2-dicarboxylate,
diheptyl cyclopentane-1,2-dicarboxylate,
didecyl cyclopentane-1,2-dicarboxylate,
diethyl cyclopentane-1,3-dicarboxylate,
diisobutyl cyclopentane-1,3-dicarboxylate,
diethyl cycloheptane-1,2-dicarboxylate, diisopropyl cycloheptane-1,2-dicarboxylate,
diisobutyl cycloheptane-1,2-dicarboxylate,
diheptyl cycloheptane-1,2-dicarboxylate,
didecyl cycloheptane-1,2-dicarboxylate,
diethyl cycloheptane-1,3-dicarboxylate,
diisobutyl cycloheptane-1,3-dicarboxylate,
diethyl cyclooctane-1,2-dicarboxylate,
diethyl cyclodecane-1,2-dicarboxylate,
diethyl 4-cyclohexene-1,2-dicarboxylate,
di-n-propyl 4-cyclohexene-1,2-dicarboxylate,
diisopropyl 4-cyclohexene-1,2-dicarboxylate,
di-n-butyl 4-cyclohexene-1,2-dicarboxylate,
diisobutyl 4-cyclohexene-1,2-dicarboxylate,
dihexyl 4-cyclohexene-1,2-dicarboxylate,
diheptyl 4-cyclohexene-1,2-dicarboxylate,
dioctyl 4-cyclohexene-1,2-dicarboxylate,
didecyl 4-cyclohexene-1,2-dicarboxylate,
diethyl 4-cyclohexene-1,3-dicarboxylate,
diisobutyl 4-cyclohexene-1,3-dicarboxylate,
diethyl 3-cyclopentene-1,2-dicarboxylate,
diisopropyl 3-cyclopentene-1,2-dicarboxylate,
diisobutyl 3-cyclopentene-1,2-dicarboxylate,
diheptyl 3-cyclopentene-1,2-dicarboxylate,
didecyl 3-cyclopentene-1,2-dicarboxylate,
diethyl 3-cyclopentene-1,3-dicarboxylate,
diisobutyl 3-cyclopentene-1,3-dicarboxylate,
diethyl 4-cycloheptene-1,2-dicarboxylate,
diisopropyl 4-cycloheptene-1,2-dicarboxylate,
diisobutyl 4-cycloheptene-1,2-dicarboxylate,
diheptyl 4-cycloheptene-1,2-dicarboxylate,
didecyl 4-cycloheptene-1,2-dicarboxylate,
diethyl 4-cycloheptene-1,3-dicarboxylate,
diisobutyl 4-cycloheptene-1,3-dicarboxylate,
diethyl 5-cyclooctene-1,2-dicarboxylate, and
diethyl 6-cyclodecene-1,2-dicarboxylate.

As preferred examples, there can be also mentioned the following compounds:
cyclohexane-1,2-diacetate,
cyclohexane-1,2-dibutanate,
cyclohexane-1,2-dibenzoate,
cyclohexane-1,2-ditoluate, etc.

In such cyclic ester compounds having a diester structure as above, isomers such as cis and trans isomers are present, and any structure of the isomers has an effect which agrees with the object of the present invention. In the cis and trans isomers, the proportion of the trans isomer is preferably not less than 51%. The lower limit is more preferably 55%, still more preferably 60%, particularly preferably 65%. On the other hand, the upper limit is preferably 100%, more preferably 90%, still more preferably 85%, particularly preferably 79%. Although the reason is not clear, it is presumed that the variations of the later-described steric isomers are in the region suitable for widening a molecular weight distribution.

In particular, the trans isomer purity of a cyclohexane-1,2-dicarboxylic acid diester wherein n in the formula (2) is 6 is in the above range.

If the trans isomer purity is less than 51%, the effect of widening a molecular weight distribution, activity, stereospecificity, etc. sometimes become insufficient. If the trans isomer purity exceeds 79%, the effect of widening a molecular weight distribution sometimes becomes insufficient. That is to say, a trans isomer purity of the above range is frequently advantageous in achieving compatibility of the effect of widening a molecular weight distribution of the resulting polymer with the activity of the catalyst and the high stereoregularity of the resulting polymer at a high level.

As the cyclic ester compound (b), a compound having a cycloalkane-1,2-dicarboxylic acid diester structure or a cycloalkene-1,2-dicarboxylic acid diester structure, each structure being represented by the following formula (2a), is particularly preferable.

[Chem. 14]

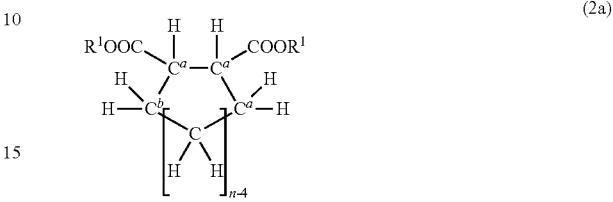

(2a)

In the formula (2a), n and $R^1$ are the same as above (that is, they have the same definitions as in the formula (2)), and single bonds in the cyclic skeleton (single bonds excluding $C^a$—$C^a$ bond and $C^a$—$C^b$ bond, that is, C—$C^a$ bond, C—$C^b$ bond and C—C bond (in the case where n is 6 to 10)) may be each replaced with a double bond.

Examples of the compounds represented by the formula (2a) include:
di-n-butyl cyclohexane-1,2-dicarboxylate,
diisobutyl cyclohexane-1,2-dicarboxylate,
dihexyl cyclohexane-1,2-dicarboxylate,
diheptyl cyclohexane-1,2-dicarboxylate,
dioctyl cyclohexane-1,2-dicarboxylate,
di-2-ethylhexyl cyclohexane-1,2-dicarboxylate,
diisobutyl cyclopentane-1,2-dicarboxylate,
diheptyl cyclopentane-1,2-dicarboxylate,
diisobutyl cycloheptane-1,2-dicarboxylate, and
diheptyl cycloheptane-1,2-dicarboxylate.

Of the above compounds, more preferable are:
diisobutyl cyclohexane-1,2-dicarboxylate,
dihexyl cyclohexane-1,2-dicarboxylate,
diheptyl cyclohexane-1,2-dicarboxylate,
dioctyl cyclohexane-1,2-dicarboxylate, and
di-2-ethylhexyl cyclohexane-1,2-dicarboxylate.

The reason is that these compounds not only exhibit catalytic performance but also can be prepared relatively inexpensively utilizing the Diels-Alder reaction.

The cyclic ester compounds (a) and the cyclic ester compounds (b) may be individually used singly or in combination of two or more kinds.

The combined molar ratio between the cyclic ester compound (a) and the cyclic ester compound (b), that is, cyclic ester compound (a)/(cyclic ester compound (a)+cyclic ester compound (b))×100 (% by mol), is preferably not less than 10% by mol, more preferably not less than 30% by mol, still more preferably not less than 40% by mol, particularly preferably 50% by mol. The upper limit is preferably 99% by mol, more preferably 90% by mol, still more preferably 85% by mol, particularly preferably 80% by mol.

The solid titanium catalyst component (I) of the present invention can provide an olefin polymer having an extremely wide molecular weight distribution under the conditions of a combined molar ratio of the cyclic ester compound (a) in a wide range, that is, even if the content of the cyclic ester compound (a) in the solid titanium catalyst component (I) is low. Although the reason of this effect is not clear, the present inventors have presumed as follows.

It is obvious that the cyclic ester compound (a) has an extremely large number of variations of steric structures which can be formed, because of presence of the substituent R, as compared with the cyclic ester compound (b). On this account, it is thought that the influence of the cyclic ester compound (a) on the molecular weight distribution becomes dominant, and even if the combined molar ratio is low, an olefin polymer having an extremely wide molecular weight distribution can be obtained.

On the other hand, the cyclic ester compound (a) and the cyclic ester compound (b) are relatively similar in the structure, and therefore, with regard to the basic properties such as activity and stereoregularity, these compounds hardly have influence on their mutual effects (when compounds having different structures are used, there are many cases where activity, stereoregularity or the like violently changes or the effect of one compound becomes dominant).

On this account, the solid titanium catalyst component (I) for use in the present invention can provide an olefin polymer having an extremely wide molecular weight distribution and high stereoregularity with high activity even if the content of the cyclic ester compound (a) is low.

The propylene-based block copolymer of the present invention is a polymer of a wide molecular weight distribution. The reason is obscure at present, but such a cause as described below can be presumed.

It is known that the cyclic hydrocarbon structure forms various steric structures such as chair form and boat form. If the cyclic structure has a substituent, variations of the steric structures which can be taken are further increased. Moreover, if the bond between a carbon atom to which an ester group ($COOR^1$ group) is bonded and another carbon atom to which an ester group ($COOR^1$ group) is bonded among the carbon atoms to constitute the cyclic skeleton of the cyclic ester compound is a single bond, variations of the steric structures which can be taken are increased. That such various steric structures can be taken as above leads to formation of various active species on the solid titanium catalyst component (I). As a result, when polymerization of olefins is carried out using the solid titanium catalyst component (I), an olefin polymer having various molecular weights can be prepared at once. That is to say, a propylene-based block copolymer having a wide molecular weight distribution can be prepared.

In the present invention, the cyclic ester compounds (a) and (b) may be formed during the course of preparation of the solid titanium catalyst component (I). For example, in the preparation of the solid titanium catalyst component (I), a step of substantially contacting carboxylic acid anhydrides or carboxylic acid dihalides corresponding to the cyclic ester compounds (a) and (b) with the corresponding alcohol is provided, whereby the cyclic ester compounds (a) and (b) can be incorporated into the solid titanium catalyst component.

In the preparation of the solid titanium catalyst component (I) for use in the present invention, a magnesium compound and a titanium compound are used in addition to the above cyclic ester compounds (a) and (b). Moreover, the later-descried catalyst component (c) and catalyst component (d) may be used in combination so long as the object of the present invention is not impaired.

Magnesium Compound

Examples of the magnesium compounds for use in the preparation of the solid titanium catalyst component (I) in the present invention include publicly known magnesium compounds, e.g., magnesium halides, such as magnesium chloride and magnesium bromide;

alkoxymagnesium halides, such as methoxymagnesium chloride, ethoxymagnesium chloride and phenoxymagnesium chloride;

alkoxymagnesiums, such as ethoxymagnesium, isopropoxymagnesium, butoxymagnesium and 2-ethylhexoxymagnesium;

aryloxymagnesiums, such as phenoxymagnesium; and carboxylic acid salts of magnesium, such as magnesium stearate.

These magnesium compounds may be used singly or may be used in combination of two or more kinds. Moreover, these magnesium compounds may be complex compounds or double compounds with other metals, or mixtures with other metal compounds.

Of these, magnesium compounds containing halogen are preferable, and magnesium halide, particularly magnesium chloride, is preferably used. In addition, alkoxymagnesium such as ethoxymagensium is also preferably used. The magnesium compound may be a compound derived from other substances, for example, a compound obtained by contacting an organomagnesium compound with titanium halide, silicon halide, halogenated alcohol or the like, such as Grignard reagent. When alkoxymagnesium is combined with tetraalkoxytitanium or the like, it is preferable to react alkoxymagnesium with silicon tetrachloride or the like as a halogenating agent to convert it into magnesium halide.

Titanium Compound

The titanium compound is, for example, a tetravalent titanium compound represented by the following formula:

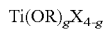

$$\text{Ti(OR)}_g X_{4-g}$$

wherein R is a hydrocarbon group, X is a halogen atom, and $0 \leq g \leq 4$

More specifically, there can be mentioned, for example, titanium tetrahalides, such as $TiCl_4$ and $TiBr_4$;

alkoxytitaniumtrihalides, such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-isoC_4H_9)Br_3$;

alkoxytitanium dihalides, such as $Ti(OCH_3)_2Cl_2$ and $Ti(OC_2H_5)_2Cl_2$;

alkoxytitanium monohalides, such as $Ti(OCH_3)_3Cl$, $Ti(O-n-C_4H_9)_3Cl$ and $Ti(OC_2H_5)_3Br$; and tetraalkoxytitaniums, such as $Ti(OCH_3)_4$, $Ti(OC_2H_5)_4$, $Ti(OC_4H_9)_4$ and $Ti(O-2-ethylhexyl)_4$.

Of these, titanium tetrahalides are preferable, and titanium tetrachloride is particularly preferable. These titanium compounds may be used singly or may be used in combination of two or more kinds.

As such magnesium compounds and titanium compounds, compounds described in detail in, for example, the aforesaid patent literatures 1 and 2 can be also mentioned.

For preparing the solid titanium catalyst component (I) of the present invention, publicly known processes can be used without any restriction, except for using the cyclic ester compounds (a) and (b). Examples of preferred processes include the following processes (P-1) to (P-4).

(P-1) Process comprising contacting a solid adduct composed of a magnesium compound and a catalyst component (c) with the cyclic ester compounds (a) and (b) and a liquid titanium compound in a suspension state in the presence of an inert hydrocarbon solvent.

(P-2) Process comprising contacting a solid adduct composed of a magnesium compound and a catalyst component (c) with the cyclic ester compounds (a) and (b) and a liquid titanium compound plural times.

(P-3) Process comprising contacting a solid adduct composed of a magnesium compound and a catalyst component (c) with the cyclic ester compounds (a) and (b) and a liquid titanium compound plural times in a suspension state in the presence of an inert hydrocarbon solvent.

(P-4) Process comprising contacting a liquid magnesium compound composed of a magnesium compound and a catalyst component (c) with a liquid titanium compound and the cyclic ester compounds (a) and (b).

In the preparation of the solid titanium catalyst component (I), the reaction temperature is preferably in the range of −30° C. to 150° C., more preferably −25° C. to 140° C., still more preferably −25° C. to 130° C.

Preparation of the Solid Titanium catalyst component (I) may be carried out in the presence of a publicly known medium, when needed. Examples of the media include aromatic hydrocarbons having slight polarity, such as toluene, and publicly known aliphatic hydrocarbons and alicyclic hydrocarbons, such as heptane, hexane, octane, decane and cyclohexane. Of these, aliphatic hydrocarbons are preferred media.

When polymerization reaction of olefins is carried out using the solid titanium catalyst component (I) prepared as above, the effect of obtaining a polymer of a wide molecular weight distribution is compatible with the activity of the catalyst and the high stereoregularity of the resulting polymer at a higher level.

Catalyst Component (c)

The catalyst component (c) used for forming the solid adduct or the liquid magnesium compound is preferably a publicly known compound capable of solubilizing the aforesaid magnesium compound at a temperature of room temperature to about 300° C., and preferred examples of such compounds include alcohols, aldehydes, amines, carboxylic acids and mixtures thereof. As such compounds, compounds described in detail in, for example, the aforesaid patent literatures 1 and 2 can be mentioned.

Examples of the alcohols having an ability to solubilize the magnesium compound include:

aliphatic alcohols, such as methanol, ethanol, propanol, butanol, isobutanol, ethylene glycol, 2-methylpentanol, 2-ethylbutanol, n-heptanol, n-octanol, 2-ethylhexanol, decanol and dodecanol;

alicyclic alcohols, such as cyclohexanol and methylcyclohexanol;

aromatic alcohols, such as benzyl alcohol and methylbenzyl alcohol; and aliphatic alcohols having alkoxy group, such as n-butyl cellosolve.

Examples of the carboxylic acids include organic carboxylic acids having 7 or more carbon atoms, such as caprylic acid and 2-ethylhexanoic acid.

Examples of the aldehydes include aldehydes having 7 or more carbon atoms, such as capric aldehyde and 2-ethylhexyl aldehyde.

Examples of the amines include amines having 6 or more carbon atoms, such as heptylamine, octylamine, nonylamine, laurylamine and 2-ethylhexylamine.

As the catalyst components (c), the above alcohols are preferable, and ethanol, propanol, butanol, isobutanol, hexanol, 2-ethylhexanol and decanol are particularly preferable.

The amounts of the magnesium compound and the catalyst component (c) used for preparing the solid adduct or the liquid magnesium compound vary depending upon the types thereof, the contact conditions, etc., but the magnesium compound is used in an amount of 0.1 to 20 mol/liter, preferably 0.5 to 5 mol/liter, based on the unit volume of the catalyst component (c). A medium inert to the solid adduct may be used in combination, when needed. Preferred examples of the media include publicly known hydrocarbon compounds, such as heptane, hexane, octane and decane.

The ratio between magnesium in the resulting solid adduct or the liquid magnesium compound and the catalyst component (c) cannot be defined indiscriminately because it varies depending upon the type of the compound used. However, the amount of the catalyst component (c) is preferably not less than 2.0 mol, more preferably not less than 2.2 mol, still more preferably not less than 2.3 mol, particularly preferably not less than 2.4 mol but not more than 5 mol, based on 1 mol of magnesium in the magnesium compound.

Aromatic Carboxylic Acid Ester and/or Compound Having Two or More Ether Linkages Through Plural Carbon Atoms The solid titanium catalyst component (I) of the present invention may further contain an aromatic carboxylic acid ester and/or a compound having two or more ether linkages through plural carbon atoms (also referred to as a "catalyst component (d)" hereinafter). When the solid titanium catalyst component (I) of the present invention contains the catalyst component (d), catalytic activity can be sometimes enhanced, stereoregularity can be sometimes increased, and molecular weight distribution can be sometimes further widened.

As such catalyst components (d), publicly known aromatic carboxylic acid esters and polyether compounds which have been preferably used for an olefin polymerization catalyst in the past, such as compounds described in, for example, the aforesaid patent literature 1 and Japanese Patent Laid-Open Publication No. 354714/2001, can be used without any restriction.

Examples of the aromatic carboxylic acid esters include aromatic carboxylic acid monoesters, such as benzoic acid ester (ethyl benzoate or the like) and toluic acid ester, and aromatic polycarboxylic acid esters, such as phthalic acid esters. Of these, aromatic polycarboxylic acid esters are preferable, and phthalic acid esters are more preferable. As the phthalic acid esters, phthalic acid alkyl esters, such as ethyl phthalate, n-butyl phthalate, isobutyl phthalate, hexyl phthalate and heptyl phthalate, are preferable, and diisobutyl phthalate is particularly preferable.

The polyether compound is more specifically a compound represented by the following formula (3).

[Chem. 15]

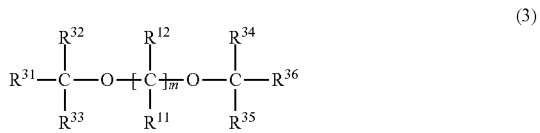

(3)

In the formula (3), m is an integer of 1 to 10, more preferably an integer of 3 to 10, particularly preferably an integer of 3 to 5. $R^{11}$, $R^{12}$ and $R^{31}$ to $R^{36}$ are each independently a hydrogen atom or a substituent having at least one element selected from carbon, hydrogen, oxygen, fluorine, chlorine, bromine, iodine, nitrogen, sulfur, phosphorus, boron and silicon.

$R^{11}$ and $R^{12}$ are each preferably a hydrocarbon group of 1 to 10 carbon atoms, more preferably a hydrocarbon group of 2 to 6 carbon atoms, and $R^{31}$ to $R^{36}$ are each preferably a hydrogen atom or a hydrocarbon group of 1 to 6 carbon atoms.

$R^{11}$ and $R^{12}$ are each specifically methyl group, ethyl group, n-propyl group, isopropyl group, n-butyl group, isobutyl group, isopentyl group, neopentyl group, hexyl group, heptyl group, octyl group, 2-ethylhexyl group, decyl group, cyclopentyl group or cyclohexyl group, and they are each preferably ethyl group, n-propyl group, isopropyl group, n-butyl group or isobutyl group.

$R^{31}$ to $R^{36}$ are each specifically hydrogen atom, methyl group, ethyl group, n-propyl group, isopropyl group, n-butyl group or isobutyl group, and they are each preferably hydrogen atom or methyl group.

Arbitrary groups of $R^{11}$, $R^{12}$ and $R^{31}$ to $R^{36}$, preferably $R^{11}$ and $R^{12}$, may form a ring other than a benzene ring in cooperation, and in the main chain, an atom other than carbon may be contained.

Examples of the compounds having two or more ether linkages include:
monosubstituted dialkoxypropanes, such as
2-isopropyl-1,3-dimethoxypropane,
2-s-butyl-1,3-dimethoxypropane, and
2-cumyl-1,3-dimethoxypropane;
 disubstituted dialkoxypropanes, such as
2-isopropyl-2-isobutyl-1,3-dimethoxypropane,
2,2-dicyclohexyl-1,3-dimethoxypropane,
2-methyl-2-isopropyl-1,3-dimethoxypropane,
2-methyl-2-cyclohexyl-1,3-dimethoxypropane,
2-methyl-2-isobutyl-1,3-dimethoxypropane,
2,2-diisobutyl-1,3-dimethoxypropane,
2,2-bis(cyclohexylmethyl)-1,3-dimethoxypropane,
2,2-diisobutyl-1,3-diethoxypropane,
2,2-diisobutyl-1,3-dibutoxypropane,
2,2-di-s-butyl-1,3-dimethoxypropane,
2,2-dineopentyl-1,3-dimethoxypropane,
2-isopropyl-2-isopentyl-1,3-dimethoxypropane, and
2-cyclohexyl-2-cyclohexylmethyl-1,3-dimethoxypropane;
 dialkoxyalkanes, such as
2,3-dicyclohexyl-1,4-dimethoxybutane,
2,3-dicyclohexyl-1,4-diethoxybutane,
2,3-diisopropyl-1,4-diethoxybutane,
2,4-diphenyl-1,5-dimethoxypentane,
2,5-diphenyl-1,5-dimethoxyhexane,
2,4-diisopropyl-1,5-dimethoxypentane,
2,4-diisobutyl-1,5-dimethoxypentane, and
2,4-diisoamyl-1,5-dimethoxypentane;
 trialkoxyalkanes, such as
2-methyl-2-methoxymethyl-1,3-dimethoxypropane,
2-cyclohexyl-2-ethoxymethyl-1,3-diethoxypropane, and
2-cyclohexyl-2-methoxymethyl-1,3-dimethoxypropane; and
 dialkoxycycloalkanes, such as
2,2-diisobutyl-1,3-dimethoxy-4-cyclohexene,
2-isopropyl-2-isoamyl-1,3-dimethoxy-4-cyclohexene,
2-cyclohexyl-2-methoxymethyl-1,3-dimethoxy-4-cyclohexene,
2-isopropyl-2-methoxymethyl-1,3-dimethoxy-4-cyclohexene
2-isobutyl-2-methoxymethyl-1,3-dimethoxy-4-cyclohexene,
2-cyclohexyl-2-ethoxymethyl-1,3-dimethoxy-4-cyclohexene
2-isopropyl-2-ethoxymethyl-1,3-dimethoxy-4-cyclohexene, and
2-isobutyl-2-ethoxymethyl-1,3-dimethoxy-4-cyclohexene.

Of these, preferable are 1,3-diethers, and particularly preferable are
2-isopropyl-2-isobutyl-1,3-dimethoxypropane,
2,2-diisobutyl-1,3-dimethoxypropane,
2-isopropyl-2-isopentyl-1,3-dimethoxypropane,
2,2-dicyclohexyl-1,3-dimethoxypropane and
2,2-bis(cyclohexylmethyl)-1,3-dimethoxypropane.

These compounds may be used singly or may be used in combination of two or more kinds.

The cyclic ester compounds (a) and (b), the catalyst component (c) and the catalyst component (d) may be considered to belong to components called electron donors by persons skilled in the art. It is known that the electron donor components exhibit an effect of enhancing stereoregularity of the resulting polymer, an effect of controlling composition distribution of the resulting polymer, a coagulant effect of controlling particle shape or particle diameter of catalyst particles, etc., with maintaining high activity of the catalyst.

It is thought that the cyclic ester compounds (a) and (b) further exhibit an effect of controlling a molecular weight distribution because they themselves are electron donors.

In the solid titanium catalyst component (I) of the present invention, the halogen/titanium ratio by atom (i.e., number of moles of halogen atom/number of moles of titanium atom) is desired to be in the range of 2 to 100, preferably 4 to 90, the cyclic ester compound (a)/titanium ratio by mol (i.e., number of moles of cyclic ester compound (a)/number of moles of titanium atom) and the cyclic ester compound (b)/titanium ratio by mol (i.e., number of moles of cyclic ester compound (b)/number of moles of titanium atom) are desired to be each in the range of 0.01 to 100, preferably 0.2 to 10, and the catalyst component (c)/titanium atom ratio by mol is desired to be in the range of 0 to 100, preferably 0 to 10.

Preferred ratios between the cyclic ester compound (a) and the cyclic ester compound (b) are as follows. The lower limit of the value (% by mol) of 100× cyclic ester compound (a)/(cyclic ester compound (a)+cyclic ester compound (b)) is 5% by mol, preferably 25% by mol, more preferably 40% by mol, particularly preferably 50% by mol. The upper limit thereof is 99% by mol, preferably 90% by mol, more preferably 85% by mol, particularly preferably 80% by mol.

The magnesium/titanium ratio by atom (i.e., number of moles of magnesium atom/number of moles of titanium atom) is desired to be in the range of 2 to 100, preferably 4 to 50.

The content of the components which may be contained in addition to the aforesaid cyclic ester compounds (a) and (b), such as the catalyst component (c) and the catalyst component (d), is preferably not more than 20% by weight, more preferably not more than 10% by weight, based on 100% by weight of the cyclic ester compounds (a) and (b).

As the more detailed conditions for preparing the solid titanium catalyst component (I), the same conditions as described in, for example, EP585869A1 (European Patent Laid-Open Application No. 0585869) and the aforesaid patent literature 2 can be preferably used, except for using the cyclic ester compounds (a) and (b).

Organometallic Compound Catalyst Component (II)

The organometallic compound catalyst component (II) is an organometallic compound containing a metal atom selected from Group 1, Group 2 and Group 13 of the periodic table. Specifically, a compound containing a Group 13 metal, such as an organoaluminum compound, an alkylate of a complex of a Group 1 metal and aluminum, an organometallic compound of a Group 2 metal, etc. can be used. Of these, an organoluminum compound is preferable.

Preferred examples of the organometallic compound catalyst components (II) include organometallic compound catalyst components described in publicly known literatures such as the aforesaid EP585869A1.

Electron Donor (III)

The olefin polymerization catalyst of the present invention may further contain an electron donor (III) when needed, in addition to the above organometallic compound catalyst component (II). The electron donor (III) is preferably an organosilicon compound. The organosilicon compound is, for example, a compound represented by the following formula (4):

$$R_n Si(OR')_{4-n} \qquad (4)$$

wherein R and R' are each a hydrocarbon group, and n is an integer of 0<n<4.

As such organosilicon compounds represented by the formula (4), diisopropyldimethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane, vinyltrimethoxysilane, vinyltriethoxysilane, t-butyltriethoxysilane, phenyltriethoxysilane, cyclohexyltrimethoxysilane, cyclopentyltrimethoxysilane, 2-methylcyclopentyltrimethoxysilane, cyclopentyltriethoxysilane, dicyclopentyldimethoxysilane, dicyclopentyldiethoxysilane, tricyclopentylmethoxysilane, dicyclopentylmethylmethoxysilane, dicyclopentylethylmethoxysilane, cyclopentyldimethylethoxysilane, etc. are used.

Of these, vinyltriethoxysilane, diphenyldimethoxysilane, dicyclohexyldimethoxysilane, cyclohexylmethyldimethoxysilane and dicyclopentyldimethoxysilane are preferably used.

A silane compound represented by the following formula (5), which is described in International Publication No. 2004/016662 pamphlet, is also a preferred example of the organosilicon compound.

$$Si(OR^a)_3(NR^b R^c) \qquad (5)$$

In the formula (5), $R^a$ is a hydrocarbon group of 1 to 6 carbon atoms, preferably an unsaturated or saturated aliphatic hydrocarbon group of 1 to 6 carbon atoms or the like, particularly preferably a saturated aliphatic hydrocarbon group of 2 to 6 carbon atoms. Examples of such groups include methyl group, ethyl group, n-propyl group, isopropyl group, n-butyl group, isobutyl group, sec-butyl group, n-pentyl group, isopentyl group, cyclopentyl group, n-hexyl group and cyclohexyl group. Of these, ethyl group is particularly preferable.

In the formula (5), $R^b$ is a hydrocarbon group of 1 to 12 carbon atoms or a hydrogen atom, preferably an unsaturated or saturated aliphatic hydrocarbon group of 1 to 12 carbon atoms, a hydrogen atom or the like. Examples thereof include hydrogen atom, methyl group, ethyl group, n-propyl group, isopropyl group, n-butyl group, isobutyl group, sec-butyl group, n-pentyl group, isopentyl group, cyclopentyl group, n-hexyl group, cyclohexyl group and octyl group. Of these, ethyl group is particularly preferable.

In the formula (5), $R^c$ is a hydrocarbon group of 1 to 12 carbon atoms or a hydrogen atom, preferably an unsaturated or saturated aliphatic hydrocarbon group of 1 to 12 carbon atoms or the like. Examples thereof include methyl group, ethyl group, n-propyl group, isopropyl group, n-butyl group, isobutyl group, sec-butyl group, n-pentyl group, isopentyl group, cyclopentyl group, n-hexyl group, cyclohexyl group and octyl group. Of these, ethyl group is particularly preferable.

Examples of the compounds represented by the above formula (5) include:
dimethylaminotriethoxysilane,
diethylaminotriethoxysilane,
dimethylaminotrimethoxysilane,
diethylaminotrimethoxysilane,
diethylaminotri-n-propoxysilane,
di-n-propylaminotriethoxysilane,
methyl-n-propylaminotriethoxysilane,
t-butylaminotriethoxysilane,
ethyl-n-propylaminotriethoxysilane,
ethyl-iso-propylaminotriethoxysilane, and
methylethylaminotriethoxysilane.

Another example of the organosilicon compound is a compound represented by the following formula (6).

$$RNSi(OR^a)_3 \qquad (6)$$

In the formula (6), RN is a cyclic amino group, and this cyclic amino group is, for example, perhydroquinolino group, perhydroisoquinolino group, 1,2,3,4-tetrahydroquinolino group, 1,2,3,4-tetrahydroisoquinolino group or octamethyleneimino group. $R^a$ is the same group as defined in the formula (5). Examples of the compounds represented by the above formula (6) include:
(perhydroquinolino)triethoxysilane,
(perhydroisoquinolino)triethoxysilane,
(1,2,3,4-tetrahydroquinolino)triethoxysilane,
(1,2,3,4-tetrahydroisoquinolino)triethoxysilane, and
octamethyleneiminotriethoxysilane.

These organosilicon compounds may be used in combination of two or more kinds.

Another preferred example of the compound useful as the electron donor (III) is the aromatic carboxylic acid ester and/or the compound having two or more ether linkages through plural carbon atoms (polyether compound), which is defined as the catalyst component (d).

The olefin polymerization catalyst of the present invention may further contain, in addition to the above components, other components useful for the olefin polymerization, when needed. Examples of other components include a carrier such as silica, an antistatic agent, a particle coagulant and a storage stabilizer. For example, when particles are formed by the use of magnesium chloride and ethanol, sorbitan distearate is used as a preferred compound of the particle coagulant.

Process for Preparing Propylene-Based Block Copolymer

The process for preparing the propylene-based block copolymer of the present invention is not specifically restricted, as long as the propylene-based block copolymer satisfies the requirements [1] to [3] and preferably further satisfies the requirements [4] and [5].

In the process for preparing the propylene-based block copolymer of the present invention, polymerization may be carried out in the presence of a prepolymerized catalyst that is obtained by prepolymerization of an olefin in the presence of the above-mentioned olefin polymerization catalyst. This prepolymerization is carried out by prepolymerizing an olefin in an amount of 0.1 to 1000 g, preferably 0.3 to 500 g, particularly preferably 1 to 200 g, based on 1 g of the olefin polymerization catalyst.

The catalyst concentration in the system of the prepolymerization can be higher than the catalyst concentration in the system of the polymerization.

The concentration of the solid titanium catalyst component (I) in the prepolymerization is desired to be usually in the range of about 0.001 to 200 mmol, preferably about 0.01 to 50 mmol, particularly preferably 0.1 to 20 mmol, in terms of titanium atom, based on 1 liter of the liquid medium.

The amount of the organometallic compound catalyst component (II) in the prepolymerization has only to be such an amount that a polymer of 0.1 to 1000 g, preferably 0.3 to 500 g, is produced based on 1 g of the solid titanium catalyst component (I), and the amount thereof is desired to be usually in the range of about 0.1 to 300 mol, preferably about 0.5 to 100 mol, particularly preferably 1 to 50 mol, based on 1 mol of titanium atom in the solid titanium catalyst component (I).

In the prepolymerization, the aforesaid electron donor (III), etc. may be used when needed, and these components are used in an amount of 0.1 to 50 mol, preferably 0.5 to 30 mol, more preferably 1 to 10 mol, based on 1 mol of titanium atom in the solid titanium catalyst component (I).

The prepolymerization can be carried out under mild conditions by adding an olefin and the above catalyst components to an inert hydrocarbon medium.

Examples of the inert hydrocarbon media employable in this case include:

aliphatic hydrocarbons, such as propane, butane, pentane, hexane, heptane, octane, decane, dodecane and kerosine;

alicyclic hydrocarbons, such as cyclopentane, methylcyclopentane, cyclohexane, cycloheptane, methylcycloheptane and cyclooctane;

aromatic hydrocarbons, such as benzene, toluene and xylene;

halogenated hydrocarbons, such as ethylene chloride and chlorobenzene; and mixtures of the above hydrocarbons.

Of the above inert hydrocarbon media, an aliphatic hydrocarbon is particularly preferably used. When the inert hydrocarbon medium is used as above, the prepolymerization is preferably carried out by a batch process.

On the other hand, the prepolymeriztion may be carried out using an olefin itself as a solvent. The prepolymerization may be carried out substantially in the absence of a solvent. In this case, the prepolymerization is preferably carried out continuously.

The olefin used in the prepolymerization may be the same as or different from the olefin used in the later-described polymerization, but it is preferably propylene.

The temperature in the prepolymerization is usually in the range of −20 to +100° C., preferably −20 to +80° C., more preferably 0 to +40° C.

Next, polymerization that is carried out after the prepolymerization or without performing prepolymerization is described.

In the present invention, the polymerization is divided into a step for preparing a crystalline propylene-based (co) polymer and a step for preparing a copolymer rubber, and the olefins used (that is, polymerized) in either step are propylene and one or more olefins selected from ethylene and α-olefins of 4 to 20 carbon atoms. Examples of the α-olefins of 4 to 20 carbon atoms include straight-chain olefins, such as 1-butene, 1-pentene, 1-hexene, 1-octene, 1-decene, 1-dodecene, 1-tetradecene, 1-hexadecene, 1-octadecene and 1-eicosene, and branched olefins, such as 4-methyl-1-pentene, 3-methyl-1-pentene and 3-methyl-1-butene. Of these, 1-butene, 1-pentene and 4-methyl-1-pentene are preferable. Accordingly, examples of preferred combinations of olefins include propylene/ethylene, propylene/1-butene, propylene/1-pentene, propylene/4-methyl-1-pentene, propylene/ethylene/1-butene, propylene/ethylene/1-pentene, and propylene/ethylene/4-methyl-1-pentene. From the viewpoint that a merit of a polymer having a wide molecular weight distribution is apt to be exhibited in a resin of high rigidity, olefins containing 1-butene and 4-methyl-1-pentene as constituents of a copolymer are particularly preferable.

Together with these α-olefins, aromatic vinyl compounds, such as styrene and allylbenzene, and alicyclic vinyl compounds, such as vinylcyclohexane and vinylcycloheptane, may be also used. Moreover, cycloolefins, such as cyclopentene, cycloheptene, norbornene and tetracyclododecene; conjugated dienes, such as isoprene and butadiene; and compounds having many unsaturated bonds, such as non-conjugated dienes, may be also used as polymerization raw materials. These compounds may be used singly or may be used in combination of two or more kinds (the olefins used together with the above ethylene and α-olefins of 4 to 20 carbon atoms are also referred to as "other olefins" hereinafter).

Of the above-mentioned other olefins, aromatic vinyl compounds are preferable. Other olefins may be used in combination as long as the amount thereof is a small amount, e.g., not more than 10% by weight, preferably not more than 5% by weight, in 100% by weight of the total amount of olefins.

In the present invention, the prepolymerization and the polymerization can be carried out by any of a liquid phase polymerization process, such as bulk polymerization, solution polymerization or suspension polymerization, and a gas phase polymerization process.

When a reaction mode of slurry polymerization is adopted as the polymerization, the aforesaid inert hydrocarbon for use in the prepolymerization may be used as the reaction solvent, or an olefin that is liquid at the reaction temperature and the reaction pressure may be used as the reaction solvent.

In the polymerization in the process for preparing the propylene block copolymer of the present invention, the solid titanium catalyst component (I) is usually used in an amount of about 0.0001 to 0.5 mmol, preferably about 0.005 to 0.1 mmol, in terms of titanium atom, based on 1 liter of the polymerization volume. The organometallic compound catalyst component (II) is usually used in an amount of about 1 to 2000 mol, preferably about 5 to 500 mol, based on 1 mol of titanium atom in the prepolymerized catalyst component in the polymerization system. When the electron donor (III) is used, the amount thereof is in the range of 0.001 to 50 mol, preferably 0.01 to 30 mol, particularly preferably 0.05 to 20 mol, based on 1 mol of the organometallic compound catalyst component (II).

By carrying out the polymerization in the presence of hydrogen, the molecular weight of the resulting polymer can be controlled (lowered), and a polymer having a high melt flow rate is obtained.

In the polymerization in the present invention, the olefin polymerization temperature is usually in the range of about 20 to 200° C., preferably about 30 to 100° C., more preferably 50 to 90° C. The pressure (gauge pressure) is usually set to normal pressure to 100 kgf/cm$^2$ (9.8 MPa), preferably about 2 to 50 kgf/cm$^2$ (0.20 to 4.9 MPa). In the process for preparing the propylene block copolymer of the present invention, the polymerization can be carried out by any of batch, semi-continuous and continuous processes. The polymerization may be carried out in two or more stages different from one another in reaction conditions. By carrying out such multi-stage polymerization, it becomes possible to further widen the molecular weight distribution of the olefin polymer.

The process for preparing the propylene-based block copolymer of the present invention is described in more detail.

According to another information by the present inventors, the n-decane-insoluble portion (Dinsol) to constitute the propylene-based block copolymer of the present invention is substantially the same as a propylene homopolymer, a propylene random polymer (propylene-based polymer containing a skeleton attributable to one or more olefins selected from ethylene and α-olefins of 4 or more carbon atoms, in an amount of not more than 1.5% by mol) or a mixture of two or more kinds thereof.

On the other hand, the n-decane-soluble portion (Dsol) is substantially the same as a propylene/ethylene copolymer, a propylene/α-olefin copolymer, a propylene/ethylene/α-olefin copolymer or a mixture of two or more kinds thereof ("copolymer" also includes random copolymer).

Accordingly, the propylene-based block copolymer of the present invention can be generally prepared by any one of the following preparation processes.

Process A

A process wherein the following two polymerization steps (polymerization step 1 and polymerization step 2) are consecutively carried out to prepare a propylene-based block copolymer satisfying the requirement [1] to the requirement [3] and preferably further satisfying the requirement [4] and/ or the requirement [5] (hereinafter, this process is sometimes referred to as a "consecutive polymerization process", and the propylene-based block copolymer obtained by this process is sometimes referred to as a "propylene-based block copolymer (A)").

Polymerization step 1: step for preparing a (co)polymer by polymerizing propylene and if necessary one or more olefins selected from ethylene and α-olefins of 4 to 20 carbon atoms in the presence of a solid titanium catalyst component (crystalline propylene-based (co)polymer preparation step).

Polymerization step 2: step for preparing a copolymer by polymerizing propylene and one or more olefins selected from ethylene and α-olefins of 4 to 20 carbon atoms in the presence of a solid titanium catalyst component (copolymer rubber preparation step).

Process B

A process wherein the (co)polymer formed in the polymerization step 1 of the process A and the copolymer formed in the polymerization step 2 of the process A are independently prepared in the presence of a solid titanium catalyst component, and then they are blended by a physical means (hereinafter, this process is sometimes referred to as a "blending process", and the propylene-based block copolymer obtained by this process is sometimes referred to as a "propylene-based block copolymer (B)").

The propylene-based block copolymer of the present invention is obtained by carrying out homopolymerization of propylene in a medium of propylene or carrying out preparation of a propylene-based copolymer containing a skeleton attributable to one or more olefins selected from ethylene and α-olefins of 4 or more carbon atoms in an amount of not more than 1.5% by mol, in the presence of the aforesaid olefin polymerization catalyst, in the polymerization step 1 and then carrying out copolymerization of propylene and one or more olefins selected from ethylene and α-olefins of 4 or more carbon atoms, in the presence of the aforesaid olefin polymerization catalyst, in the polymerization step 2, as described in the process A. The finally obtained propylene-based block copolymer is characterized by being constituted of 5 to 80% by weight of the room temperature n-decane-soluble portion (Dsol) and 20 to 95% by weight of the room temperature n-decane-insoluble portion (Dinsol).

When homopolymerization of propylene is carried out using such an olefin polymerization catalyst as above, a propylene-based block copolymer having a decane-insoluble component content of not less than 70% by weight, preferably not less than 85% by weight, particularly preferably not less than 90% by weight, and having high stereoregularity, that is, containing a large amount of a crystalline component is obtained.

According to the process for preparing the propylene-based block copolymer of the present invention, moreover, a propylene polymer having a wide molecular weight distribution can be obtained even by polymerization of a small number of stages, e.g., polymerization of single stage, without performing multi-stage polymerization, by virtue of the action of the olefin polymerization catalyst of the present invention.

A characteristic of the process for preparing the propylene-based block copolymer of the present invention is particularly that an olefin polymer having a higher proportion of a high-molecular weight component and a lower proportion of a low-molecular weight component than a conventional olefin polymer having an equivalent melt flow rate (MFR) is obtained in many cases. This characteristic can be confirmed by the later-described gel permeation chromatography (GPC) measurement, and a polymer having both of a high Mw/Mn value and a high Mz/Mw value can be obtained.

Polypropylene obtained by the use of a conventional solid titanium catalyst component comprising magnesium, titanium, halogen and an electron donor generally has a Mw/Mn value, which is an index of a molecular weight distribution determined by GPC measurement, of not more than 6 and a Mz/Mw value of less than 4 in the MFR region of, for example, 1 to 10 g/10 min. However, when the process for preparing the propylene-based block copolymer of the present invention is used, a propylene-based block copolymer having a Mw/Mn value of 7 to 30, preferably 8 to 20, can be obtained under the same polymerization conditions as above.

Furthermore, it has been found that a polymer having a high Mz/Mw value is obtained by the process for preparing the propylene-based block copolymer of the present invention, and the Mz/Mw value is in the range of 6.0 to 20, preferably 6.5 to 18, more preferably 7 to 15. The upper limit of the Mz/Mn value is preferably 300, more preferably 250, particularly preferably 200. The lower limit thereof is preferably 70, more preferably 100, particularly preferably 120. In the process for preparing the propylene-based block copolymer of the present invention, a polymer having a high Mz/Mw value and a high Mz/Mn value is obtained in many cases.

It has been considered to be a matter of common knowledge by a person skilled in the art that a propylene polymer having a high Mw/Mn value is excellent in moldability and rigidity. On the other hand, a high Mz/Mw value indicates that the content of a high-molecular weight component is high, and it can be readily expected that the resulting propylene polymer has high possibilities of high melt tension and excellent moldability If the process for preparing the propylene-based block copolymer of the present invention is used, a polymer having a wide molecular weight distribution, namely a high Mw/Mn value, can be obtained even if multi-stage polymerization is not carried out, and therefore, there is a possibility that a propylene polymer having excellent moldability and rigidity can be obtained by a polymer production apparatus of simple form. When polymerization is carried out by a conventional multi-stage polymerization process using the olefin polymerization catalyst of the present invention, a polymer having a wider molecular weight distribution can be prepared, and it is expected that the resulting polymer has more excellent melt tension and moldability.

Furthermore, if the process fox preparing the propylene-based block copolymer is used, a polymer containing a large amount of a high-molecular weight component, that is, a polymer having a high Mz/Mw value and a high Mz/Mn value, can be obtained. Therefore, a polymer having compatibility of high fluidity with high melt tension is obtained, and injection molding to produce large-sized products or shortening of injection molding cycle becomes possible. Moreover, appearance of an injection molded article becomes good, and blow moldability or foam moldability becomes good, that is, impartation of molding processability becomes possible.

As other processes to obtain a polymer of a wide molecular weight distribution, there are a process comprising melt mixing polymers of different molecular weights and a process comprising melt kneading them, but a polymer obtained by these processes is sometimes insufficient in improvement of melt tension or moldability considering relatively complicated works. The reason is presumed to be that polymers of different molecular weights are basically difficult to mix. On the other hand, in the polymer obtained by the process for preparing the propylene-based block copolymer of the present invention, polymers having different molecular weights of an extremely wide range are mixed on the catalytic level, that is, nano-level, and hence, the resulting polymer is expected to have high melt tension and excellent moldability.

The propylene-based block copolymer of the present invention has a characteristic of a low content of a metal residue derived from a catalyst because a catalyst of high activity is used.

A propylene-based polymer obtained by the use of a titanium trichloride catalyst that is well known as a catalyst capable of widening a molecular weight distribution contains a large amount of a metal residue because the catalyst has low activity. It is said that when the amount of a metal reside is large, evil influence such as deterioration of appearance, lowering of resin properties or coloring of resin is frequently brought about though it depends upon the use purpose. On that account, deashing treatment is generally carried out by using an alcohol or an acid and applying heat, whereby a metal component derived from the catalyst and remaining in the polymer is removed. In the case of the titanium trichloride catalyst, the amount of a titanium metal contained in the polymer before deashing is in the range of about 30 to 200 ppm, but by performing deashing treatment, the amount of the titanium metal can be decreased down to 2 to 50 ppm. On the other hand, in the case of the high-activity catalyst used to obtain the propylene-based block copolymer of the present invention, the amount of a titanium metal component contained in the polymer before deashing is in the range of 1 to 30 ppm, and by performing deashing treatment, the amount of the titanium metal component can be decreased down to 0.1 to 2 ppm.

Propylene Resin Composition

The propylene resin composition of the present invention is a composition obtained by mixing the propylene-based block copolymer of the present invention with the following various additives, preferably with an inorganic filler and/or an elastomer Stabilizer Contained in Propylene Resin Composition As stabilizers for use in the present invention, publicly known stabilizers, such as heat stabilizer, weathering stabilizer, light stabilizer, chloride absorbent, filler, crystal nucleating agent and softener, can be used without any restriction. Examples of such stabilizers include publicly known phenol-based stabilizers, organic phosphite-based stabilizers, thioether-based stabilizers, hindered amine-based stabilizers, higher fatty acid metal salts such as calcium stearate, inorganic oxides, and glass fibers.

Other Components Contained in Propylene Resin Composition

The propylene resin composition of the present invention may further contain other heat stabilizer, weathering stabilizer, antistatic agent, slip agent, anti-blocking agent, anti-fogging agent, lubricant, dye, pigment, natural oil, synthetic oil, wax, etc.

In order to impart impact resistance to the propylene resin composition of the present invention, an elastomer component may be added. Examples of the elastomers include a propylene/α-olefin block copolymer that is different from the propylene-based block copolymer of the present invention, an ethylene/α-olefin random copolymer, an ethylene/α-olefin/non-conjugated polyene random copolymer, a hydrogenated propylene/α-olefin block copolymer, other elastomeric polymers and mixtures thereof. These elastomer components are preferably used in an amount of 1 to 100 parts by weight, more preferably 3 to 60 parts by weight, based on 100 parts by weight of the propylene-based block copolymer of the present invention, though the amount thereof is not specifically restricted.

To the propylene resin composition of the present invention, other propylene polymer components may be added when needed, within limits not detrimental to the effects of the present invention.

Moreover, the propylene resin composition may contain inorganic fillers, such as silica, diatomaceous earth, alumina, titanium oxide, magnesium oxide, pumice powder, pumice balloon, aluminum hydroxide, magnesium hydroxide, basic magnesium carbonate, dolomite, calcium sulfate, potassium titanate, barium sulfate, calcium sulfite, talc, clay, mica, asbestos, glass fiber, glass flake, glass bead, calcium silicate, montmorillonite, bentonite, graphite, aluminum powder, molybdenum sulfide, boron fiber and silicon carbide fiber, and organic fillers, such as polyethylene fiber, polypropylene fiber, polyester fiber, polyamide fiber and carbon fiber, within limits not detrimental to the object of the present invention. These fillers are preferably used in an amount of 1 to 100 parts by weight, more preferably 3 to 60 parts by weight, based on 100 parts by weight of the propylene-based block copolymer of the present invention, though the amount thereof is not specifically restricted.

The propylene-based block copolymer used in the present invention has a characteristic that it contains a relatively large amount of a high-molecular weight component, as described above. It is known that the high-molecular weight component tends to undergo scission due to energy, such as heat, light or shearing. If molecular scission takes place, the molecular weight distribution is narrowed, and problems such as lowering of high-speed molding performance and difficulty in production of large-sized molded articles may occur. Therefore, it is preferable to select additives exerting higher effects than the conventional ones or to increase the amounts of the additives added.

Resin Molded Products

Examples of resin molded products made from the propylene-based block copolymer include injection molded product, molded foam, injection molded foam, extruded product, blow molded product, vacuum/pressure formed product, calendered product, stretched film and inflation film.

The above various molded products are described below in detail.

Injection Molded Product

The injection molded product of the present invention has an excellent balance between rigidity and low-temperature impact resistance, and it is free from defects such as flow mark and graininess, that is, the molded product appearance is good. Hence, such injection molded products of the present invention can be preferably used particularly for automotive exterior trim parts, such as bumper, side molding, fender and under cover, automotive interior trim parts, such as instrument panel, door trim and pillar, engine room peripheral parts, other automotive parts, household appliance parts, food containers, beverage containers, medical containers, containers, etc., though their use applications are not specifically restricted.

As the molding conditions to produce the injection molded product of the present invention, hitherto publicly known conditions can be adopted without any restriction.

Molded Foam

The molded foam of the present invention can be produced by heating a resin composition for forming a foamed product, which comprises the propylene-based block copolymer of the present invention, a blowing agent, and if necessary, an organic peroxide, a crosslinking assistant, etc.

As examples of general processes for producing a molded foam, there can be mainly mentioned the following two processes.

(1) A process comprising heating the propylene-based block copolymer, a decomposition, type blowing agent and if necessary other additives to melt them and subjecting the melt to foam molding.

(2) A process comprising forcing a volatile type blowing agent into the propylene-based block copolymer that is in a molten state and then extruding the copolymer by an extruder to perform foam molding.

The decomposition type blowing agent used in the process (1) is a blowing agent which is decomposed to generate a gas such as carbonic acid gas or nitrogen gas, and it may be an inorganic blowing agent or may be an organic blowing agent. Moreover, an organic acid to accelerate generation of a gas may be added and used in combination. Examples of the decomposition type blowing agents include the following compounds:

(a) inorganic blowing agents, such as sodium bicarbonate, sodium carbonate, ammonium bicarbonate, ammonium carbonate, ammonium nitrite, citric acid and sodium citrate; and (b) organic blowing agents, e.g., N-nitroso compounds, such as N,N'-dinitrosoterephthalamide and N,N'-dinitrosopentamethylenetetramine, azo compounds, such as azodicarbonamide, azobisisobutyronitrile, azocyclohexylnitrile, azodiaminobenzene and barium azodicarboxylate, sulfonylhydrazide compounds, such as benzenesulfonyl hydrazide, toluenesulfonyl hydrazide, p,p'-oxybis(benzenesulfonyl hydrazide) and diphenylsulfone-3,3'-disulfonylhydrazide, and azide compounds, such as calcium azide, 4,4'-diphenyldisulfonyl azide and p-toluenesulfonyl azide.

These blowing agents can be used singly or in combination of two or more kinds. Of these, carbonates or hydrogencarbonates such as sodium hydrogencarbonate are preferable. The amount of the blowing agent added (kneaded) is selected according to the type of the blowing agent and the aimed expansion ratio, and is preferably in the range of 0.5 to 100 parts by weight based on 100 parts by weight of the propylene-based block copolymer.

In order to control the size of a cell diameter of the foamed product, a blowing nucleating agent, such as an organic carboxylic acid (e.g., citric acid) or talc, may be used in combination. The blowing nucleating agent is preferably added in an amount of 0.01 to 1 part by weight based on 100 parts by weight of the propylene-based block copolymer.

In the process (1), the propylene-based block copolymer and the decomposition type blowing agent are both fed to a melt extruder, then with melt kneading them at an appropriate temperature, the blowing agent is thermally decomposed to generate a gas, and the molten propylene-based block copolymer containing the gas is discharged from a die, whereby a foamed product can be produced. The melt kneading temperature and the melt kneading time in this process are properly determined according to the type of the blowing agent used and the kneading conditions, and the melt kneading can be usually carried out at a melt kneading temperature of 170 to 300° C. for a melt kneading time of 1 to 60 minutes.

Preferred examples of the volatile type blowing agents for use in the process (2) include aliphatic hydrocarbons, such as propane, butane, pentane, hexane and heptane; alicyclic hydrocarbons, such as cyclobutane, cyclopentane and cyclohexane; halogenated hydrocarbons, such as chlorodifluoromethane, di fluoromethane, trifluoromethane, trichlorofluoromethane, dichloromethane, dichlorofluoromethane, dichlorodifluoromethane, trichlorofluoromethane, chloromethane, chloroethane, dichlorotrifluoroethane, dichlorofluoroethane, chlorodifluoroethane, dichloropentafluoroethane, tetrafluoroethane, difluoroethane, pentafluoroethane, trifluoroethane, dichlorotetrafluoroethane, trichlorotrifluoroethane, tetrachlorodifluoroethane, chloropentafluoroethane and perfluorocyclobutane; inorganic gases, such as carbon dioxide, nitrogen and air; and water. These volatile type blowing agents can be used singly or in combination of two or more kinds.

Although the amount of the blowing agent added (kneaded) in the process (2) varies depending upon the type of the blowing agent and the aimed expansion ratio, it is preferably in the range of 0.5 to 100 parts by weight based on 100 parts by weight of the propylene-based block copolymer. In the process (2), the propylene-based block copolymer is melted in an extruder, then the volatile type blowing agent is forced into the extruder and kneaded with the molten propylene-based block polymer with maintaining the system at a high pressure, and a kneadate of the sufficiently kneaded propylene-based block copolymer and the volatile type blowing agent is extruded from a die, whereby a foamed product can be produced. The melt kneading temperature and the melt kneading time in this process are properly selected according to the type of the blowing agent used and the kneading conditions. The melt kneading temperature is usually in the range of 130 to 300° C., and the melt kneading time is usually in the range of 1 to 120 minutes.

In the production of the molded foam of the present invention, an organic peroxide may be used, when needed. This organic peroxide is preferably used in an amount of 0.01 to 5 parts by weight, particularly preferably 0.01 to 1 part by weight, based on 100 parts by weight of the propylene-based block copolymer.

In the production of the molded foam of the present invention, a crosslinking assistant may be used, when needed. The functions of the crosslinking assistant are as follows. By virtue of the organic peroxide, hydrogen of an olefin polymer is abstracted to thereby generate a polymer radical, and before the polymer radical undergoes cleavage reaction, the polymer radical is reacted with the crosslinking assistant, whereby the polymer radical is stabilized, and at the same time, crosslinking efficiency is enhanced. Examples of the crosslinking assistants having such functions include an unsaturated compound usually having one or more double bonds, an oxime compound, a nitroso compound and a maleimide compound. These crosslinking assistants are used singly or in combination of two or more kinds.

The molded foam of the present invention may be in any form, and may be in the form of a block, a sheet or a monofilament. For producing the molded foam of the present invention from the propylene-based block copolymer, a hitherto publicly known foam molding apparatus can be used. As the molding conditions, hitherto publicly known conditions can be adopted.

For example, a composition obtained by mixing the propylene-based block copolymer, a blowing agent, and if necessary, an organic peroxide, a crosslinking assistant and a heat stabilizer with one another in the aforesaid mixing ratio by a Henschel mixer, a V-blender, a ribbon blender, a tumbler blender or the like is kneaded by the use of an extruder, preferably a vented extruder, with absorbing an unnecessary volatile substance through a vent provided in the rear of the high-temperature heating zone. When the organic peroxide is added, kneading is carried out in the temperature range where the organic peroxide is decomposed but the blowing agent is not decomposed.

The melt containing foam cells is discharged from a T-die or a cylindrical die to preferably form a sheet, whereby a foamed product can be produced. When the melt is discharged from a cylindrical die, the resulting cylindrical sheet is usually smoothed as it is or cut into plural portions and then smoothed, followed by taking off the smoothed sheet.

The molded foam produced from the propylene-based block copolymer obtained by the process in the present invention preferably has a density of 0.09 to 0.6 g/cm$^3$, particularly preferably 0.15 to 0.3 g/cm$^3$, from the viewpoint that such a molded foam has favorable lightweight properties, heat insulation properties, cushioning properties against external stress, or compression strength. Therefore, the expansion ratio of the molded foam is preferably in the range of 1.3 to 10 times, particularly preferably 1.6 to 6 times.

Although use applications of the molded foams of the present invention are not specifically restricted, there can be specifically mentioned, for example, stationery such as file case, automotive interior trim such as automotive roof liner, trays, food trays, containers for noodles, lunch boxes, fast food containers, retort containers, frozen food containers, containers for daily dishes, heat-resistant containers for microwave oven, cups, synthetic wood, original sheets of various foamed products, various cushioning materials, various heat insulating materials, various sound insulating materials and various vibration insulating materials.

Injection Molded Foam

Since the propylene-based block copolymer of the present invention has high melt tension and excellent balance between rigidity and impact resistance, an injection molded foam having high expansion ratio, favorable surface appearance and excellent mechanical strength can be obtained from the propylene-based block copolymer of the present invention.

The injection molded foam of the present invention can be produced by subjecting an injection molded foam-forming resin composition, which comprises the propylene-based block copolymer, a blowing agent, and if necessary, an organic peroxide, a crosslinking assistant, etc., to injection foam molding. For the purpose of imparting impact resistance and rigidity to the injection molded foam, a propylene-based resin composition obtained by adding an inorganic filler and/or an organic filler and an elastomer component to the propylene-based block copolymer may be subjected to injection foam molding.

As the blowing agents for the injection foaming, blowing agents usually used for injection foam molding, such as a chemical blowing agent and a physical blowing agent, can be used without any restriction. The chemical blowing agent is mixed with a resin in advance, then fed to an injection molding machine and decomposed in a cylinder to generate a gas such as carbonic acid gas.

Examples of the chemical blowing agents include inorganic chemical blowing agents, such as sodium bicarbonate and ammonium carbonate, and organic chemical blowing agents, such as azodicarbonamide and N,N'-dinitrosopentamethylenetetramine. The physical blowing agent is injected in the form of a gas or a supercritical fluid into a molten resin in a cylinder of a molding machine and is dispersed or dissolved therein, and it functions as a blowing agent upon release of a pressure after it is injected into a mold. Examples of the physical blowing agents include aliphatic hydrocarbons, such as propane and butane, alicyclic hydrocarbons, such as cyclobutane and cyclopentane, halogenated hydrocarbons, such as chlorodifluoromethane and dichloromethane, and inorganic gases, such as nitrogen, carbonic acid gas and air. These physical blowing agents may be used singly or in combination of two or more kinds.

Of the above blowing agents, an inorganic chemical blowing agent is preferable as the chemical blowing agent, and an inorganic gas, such as nitrogen, carbonic acid gas or air, is preferable as the physical blowing agent, because a usual injection molding machine can be safely used, and uniform and fine cells are apt to be obtained.

In order to stably obtain uniform and fine cells of the molded foam, blowing aids, e.g., organic acids such as citric acid, and nucleating agents, e.g., inorganic fine particles such as lithium carbonate, may be added to these blowing agents, when needed.

From the viewpoints of handling properties, storage stability and dispersibility in the polypropylene-based resin, the inorganic chemical blowing agent is preferably used as a masterbatch of a polyolefin-based resin having a concentration of usually 10 to 50% by weight.

The amount of the blowing agent used is properly determined according to the expansion ratio of the final product, the type of the blowing agent and the resin temperature in the molding process. For example, the inorganic chemical blowing agent is preferably used in an amount of not less than 0.5 part by weight but not more than 20 parts by weight, more preferably not less than 1 part by weight but not more than 10 parts by weight, based on 100 parts by weight of the propylene-based block copolymer of the present invention. By the use of the blowing agent in an amount of the above range, a molded foam having an expansion ratio of not less than 2 times and containing uniform and fine cells is apt to be economically obtained.

Moreover, additives, e.g., stabilizers, such as antioxidant, metal deactivator, phosphorus-based processing stabilizer, ultraviolet light absorber, ultraviolet stabilizer, fluorescent brightener, metal soap and absorbent antacid, crosslinking agent, chain transfer agent, nucleating agent, plasticizer, filler, reinforcing material, pigment, dye, flame retardant and antistatic agent, may be used in combination. Although it is a matter of course that these additives are used when needed in amounts not detrimental to the effects of the present invention, they are preferably used in amounts of not less than 0.01 part by weight but not more than 10 parts by weight based on 100 parts by weight of the propylene-based block copolymer of the present invention.

Next, the injection foam molding process is described in detail.

To the injection foam molding process, a publicly known process is applicable, and the molding conditions are properly controlled according to the MFR of the polypropylene-based resin, the type of the blowing agent, the type of the molding machine and the shape of the mold. In the case of a polypropylene-based resin, injection foam molding is usually carried out under the conditions of a resin temperature of 170 to 250° C., a mold temperature of 10 to 100° C., a molding cycle of 1 to 60 minutes, an injection rate of 10 to 300 mm/sec and an injection pressure of 10 to 200 MPa. There are various processes for in-mold foaming, and of these, a so-called core back process (moving cavity process) wherein a mold constituted of a fixed core and a moving core that is movable back and forth to the arbitrary position is used, and after completion of injection, the moving core is moved back to perform foaming is preferable, because a non-foam layer is formed on the surface, the foam layer inside tends to have uniform and fine cells, and a molded foam having excellent lightweight properties is apt to be obtained. Moving of the moving core back may be carried out in one stage or may be carried out in plural stages of two or more stages, and the speed to move the moving core back may be properly controlled. Thus, an injection molded foam can be obtained.

The propylene-based block copolymer of the present invention has high fluidity in the melting and has high melt tension. Therefore, by the use of the propylene-based block copolymer, large-sized injection molded foams having high expansion ratio, excellent lightweight properties and good surface appearance are obtained. The injection molded foams can be widely used for automotive interior trim, such as luggage box, console box, tool box and door trim, containers for food packaging, household appliance housing, boxes for daily use miscellaneous goods, etc.

Extruded Product

The extruded product of the present invention is produced by subjecting the propylene-based block copolymer of the present invention to extrusion process. Since the propylene-based block copolymer has high melt tension, high-speed extrusion becomes possible, and large-sized articles can be obtained.

For producing the extruded product of the present invention from the propylene-based block copolymer, a hitherto publicly known extruding apparatus can be used. For example, a single screw extruder, a kneading extruder, a ram extruder, a gear extruder or the like is used. In the extruder, a ring die or a T-die may be installed.

As the extrusion conditions, hitherto publicly known conditions are adoptable. Of such extrusion conditions, the following conditions are preferably used to produce an extruded product in the present invention.

For example, by the use of an extruder provided with a T-die, a sheet is produced at a resin temperature of 100 to 300° C., preferably 150 to 270° C., and a T-die temperature of 80° C. to 270° C., preferably 130° C. to 250° C., For cooling the extruded product, water is used, or when a sheet is produced, an air knife or a cooling roll may be used. By feeding paper or cloth onto a roll in the extrusion, artificial leather, waterproof cloth and various laminated articles can be produced.

In the extruded products, a so-called extruded profile having a characteristic of a grain-like surface is also included.

The extruded profile of the present invention is produced by subjecting the propylene-based block copolymer to contour extrusion. Since the propylene-based block copolymer has high melt tension, shaping properties are excellent, and drawdown tends to be improved.

For producing the molded profile, a hitherto publicly known process, such as a process comprising feeding a resin containing a filler such as woodmeal or talc to an extruder and extruding the resin from a die having a desired shape or a process comprising side feeding a filler-containing resin to an extruder separately from a base resin, can be adopted. Specifically, a process described in Japanese Patent Laid-Open Publication No. 138176/2002 can be adopted.

Although use applications of the extruded products of the present invention are not specifically restricted, there can be mentioned, for example, molded profiles, such as gutter, curtain rail, window frame, shelf, door, other building materials, wiring duct, roll shutter and shutter; and others, such as tube, la pipe, hose, electric wire (covered), film, sheet, plate, fiber, tape and monofilament.

Blow Molded Product

The blow molded product of the present invention is produced by subjecting the propylene-based block copolymer to blowing. Since the propylene-based block copolymer has high melt tension, high-speed blow molding becomes possible, and large-sized articles can be obtained.

For producing the blow molded product of the present invention from the propylene-based block copolymer, a hitherto publicly known blow molding apparatus can be used. As the molding conditions, hitherto publicly known conditions can be adopted. Of such molding conditions, the following conditions are preferably used to produce a molded product in the present invention.

In the case of, for example, extrusion blow molding, a resin is extruded from a die at a resin temperature of 170 to 300° C., preferably 170 to 270° C., to form a tubular parison, then the parison is held in the corresponding mold, and thereafter air is blown to fit it into the mold at a resin temperature of 130 to 270° C., preferably 200 to 270° C. In this case, the stretch ratio can be preferably set to about 1.5 to 10 times in the cross direction.

Although use applications of the blow molded products of the present invention are not specifically restricted, there can be mentioned, for example, automotive exterior trim, such as automotive bumper, automotive spoiler, side molding, front grille guard and bumper guard; automotive interior trim, such as sun visor, radiator tank, washer tank, duct, distributor, evaporator case, console box, indicator panel and door trim; containers, such as kerosine tank, food container, shampoo container, cosmetic container, detergent container, medicine container and toner container; and others, such as toy and container.

Vacuum/Pressure Formed Product

The vacuum/pressure formed product of the present invention is produced by subjecting a sheet of the propylene-based block copolymer of the present invention to vacuum forming or pressure forming. Since the propylene-based block copolymer has high melt tension, the sheet is sufficiently deformed according to the shape of the mold. In the case of the vacuum/pressure formed product of the present invention, therefore, production of large-sized articles is possible, and deep drawing is also possible.

For producing the vacuum/pressure formed product of the present invention from the propylene-based block copolymer, a vacuum forming apparatus or a pressure forming apparatus hitherto publicly known can be used. As the forming conditions, hitherto publicly known conditions can be adopted.

For example, a molded product in the form of a sheet obtained from the propylene-based block copolymer is held on a mold of a desired shape at a temperature of 180° C. to 300° C., preferably 100° C. to 270° C., particularly preferably 120° C. to 250° C., and the mold is evacuated, or a compressed gas is injected into the mold, or a compressed gas is injected into the mold, whereby a vacuum/pressure formed product is obtained.

Although use applications of the vacuum/pressure formed products of the present invention are not specifically restricted, there can be mentioned, for example, automotive interior trim such as automotive roof liner, refrigerator interior trim, washing machine interior or exterior trim, jelly containers, disposable lunch boxes, trays, food trays, foamed trays for food, Tofu packages, cups, bags, heat-resistant containers for microwave oven, machine protective cases, and merchandise packaging cases.

Calendered Product

The calendered product of the present invention is produced by subjecting the propylene-based block copolymer of the present invention to calendering. Since the propylene-based block copolymer has high melt tension, a film having a thickness of little unevenness can be obtained.

For producing the calendered product of the present invention from the propylene-based block copolymer, a hitherto publicly known calendering apparatus can be used. As the calendering conditions, hitherto publicly known conditions can be adopted.

For example, a calendering apparatus of series type, L type, reverse L type, Z type or the like can be used. As the calendering conditions, the resin temperature is in the range of 100° C. to 300° C., preferably 130° C. to 270° C., and the roll temperature is in the range of 100° C. to 350° C., preferably 130° C. to 300° C., particularly preferably 150° C. to 270° C.

By feeding paper or cloth to the roll in the calendering, artificial leather, waterproof cloth and various laminated articles can be produced.

Although use applications of the calendered products of the present invention are not specifically restricted, there can be mentioned, for example, original sheets of various cards and original sheets of daily-use miscellaneous goods.

Stretched Film

The stretched film of the present invention is produced by subjecting the propylene-based block copolymer of the present invention to stretching. Since the propylene-based block copolymer has high melt tension, it has excellent molding stability and can be molded at a high speed.

The stretched film of the present invention usually has a thickness of 5 to 200 μm, preferably 10 to 120 μm. When the stretched film of the present invention is a biaxially oriented film, it usually has a stretch ratio of 20 to 70 times, preferably 40 to 60 times, and when the stretched film of the present invention is a monoaxially stretched film, it usually has a stretch ratio of 2 to 10 times, preferably 2 to 6 times.

For producing the stretched film of the present invention from the propylene-based block copolymer, a hitherto publicly known stretching apparatus can be used. For example, tentering (lengthwise/widthwise stretching, widthwise/lengthwise stretching), simultaneous biaxial orientation and monoaxial stretching can be used.

As the molding conditions, hitherto publicly known conditions can be adopted. For example, a stretched film can be produced by melt extruding a resin into a film at a temperature of 220 to 280° C., preferably 240 to 270° C., and stretching the film to 2 to 10 times, preferably 2 to 6 times, in the lengthwise direction.

Although use applications of the stretched films of the present invention are not specifically restricted, there can be mentioned, for example, films for food packaging such as sweets packaging and vegetable packaging; shrink films for cup noodle and the like; films for packaging fiber products such as shirt, T-shirt and panty hose; films for stationary such as clear file and clear sheet; films for cigarette packaging; light packaging films; decorating tapes; and packaging tapes.

Inflation Film

The inflation film of the present invention is produced by subjecting the propylene-based block copolymer of the present invention to inflation. Since the propylene-based block copolymer has high melt tension, the bubble is stable in the inflation process, and the speed can be increased in the production process.

For producing the inflation film of the present invention from the propylene-based block copolymer, a hitherto publicly known inflation apparatus can be used. As the inflation conditions, hitherto publicly known conditions can be adopted.

For example, a resin temperature of 180° C. to 240° C., cooling air having a first stage or second stage temperature of 10° C. to 40° C., a take-off rate of 5 m/min to 200 m/min, and a swell ratio of 1.1 times to 5 times can be adopted.

Such an inflation film has a thickness of 10 μm to 1 mm, preferably about 15 μm to 0.5 mm.

Although use applications of the inflation films of the present invention are not specifically restricted, there can be mentioned, for example, films for food packaging such as sweets packaging and vegetable packaging; films for packaging fiber products such as shirt, T-shirt and panty hose; films for stationary such as clear file and clear sheet; laundry bags; films for fashion bags; agricultural films; and cups.

Other Molded Products

Molded products of the propylene-based block copolymer of the present invention other than the above-mentioned molded products can be obtained by other publicly known molding processes such as stamping process.

EXAMPLES

The present invention is further described with reference to the following examples, but it should be construed that the present invention is in no way limited to those examples.

In the following examples, bulk specific gravity, melt flow rate, intrinsic viscosity ($[\eta]$), amount of room temperature n-decane-soluble (insoluble) component and molecular weight distribution of a propylene-based block copolymer were measured by the following methods.

(1) Melt Flow Rate (MFR, (g/10 min))

Melt flow rate was measured under a load of 2.16 kg in accordance with ASTM D1238E. The measuring temperature was 230° C.

(2) Intrinsic Viscosity ($[\eta]$, (dl/g))

Polymer particles were dissolved in decalin, and intrinsic viscosity was measured in decalin at a temperature of 135° C. in accordance with a conventional method.

(3) Amount of Room Temperature n-Decane-Soluble (Insoluble) Component (% by Weight)

In a glass measuring container, about 3 g (weight was measured down to a unit of $10^{-4}$ g; this weight is represented by b (g) in the following formula) of a propylene-based block copolymer, 500 ml of decane and a small amount of a decane-soluble heat stabilizer were placed, and with stirring by a stirrer, they were heated to 150° C. over a period of 2 hours in a nitrogen atmosphere to dissolve the propylene-based block copolymer, held at 150° C. for 2 hours and then slowly cooled down to 23° C. over a period of 8 hours. The resulting liquid containing a precipitate of the propylene-based block copolymer was filtered under reduced pressure through a glass filter of 25G-4 specification available from Iwata Glass Co., Ltd. Then, 100 ml of the filtrate was withdrawn and vacuum dried to obtain a part of a decane-soluble component, and this weight was measured down to a unit of $10^{-4}$ g (this weight is represented by a (g) in the following formula). After this operation, the amount of the decane-soluble component was determined by the following formula.

Content of room temperature $n$-decane-soluble component (Dsol)=100×(500×$a$)/(100×$b$)

Content of room temperature $n$-decane-insoluble component (Dinsol)=100−100×(500×$a$)/(100×$b$)

(4) Molecular Weight Distribution

Liquid chromatograph: Waters ALC/GPC 150-c plus model (differential refractometer detector integration type)

Column: Two of Tosoh GMH6-HT and two of Tosoh GMH6-HTL were connected in series.

Mobile phase medium: o-dichlorobenzene

Flow rate: 1.0 ml/min

Measuring temperature: 140° C.

Calibration curve making method: Standard polystyrene sample was used.

Sample concentration: 0.10% (w/w)

Amount of sample solution: 500 µl

Measurement was carried out under the above conditions, and the resulting chromatogram was analyzed by a conventional method to calculate Mw/Mn value, Mz/Mw value and Mz/Mn value. The measuring time based on one sample was 60 minutes.

(5) Pentad fraction (mmmm, (%))

Pentad fraction (mmmm, (%)) is one index of stereoregularity of a polymer and is a result of examination of microtacticity of the polymer. The pentad fraction was calculated from a peak intensity ratio of a $^{13}$C-NMR spectrum of a propylene polymer, said peaks being assigned based on Macromolecules 8, 687 (1975). The $^{13}$C NMR spectrum was measured by a JEOL EX-400 device at a temperature of 130° C. using TMA as a reference and using an o-dichlorobenzene solvent.

(6) Flexural Modulus

ASTM Specimen

Flexural modulus (FM, (MPa)) was measured under the following conditions in accordance with ASTM D790.

Measuring Conditions

Specimen: 12.7 mm (width)×6.4 mm (thickness)×127 mm (length)

Bending rate: 2.8 mm/min

Bending span: 100 mm

JIS Small Specimen

Flexural modulus (FM, (MPa)) was measured under the following conditions in accordance with JIS K7171.

Measuring Conditions

Specimen: 10 mm (width)×4 mm (thickness)×80 mm (length)

Bending rate: 2 mm/min

Bending span: 64 mm (7) Izod Impact Strength

ASTM Specimen

Izod impact strength (IZ, (J/m)) was measured under the following conditions in accordance with ASTM D256.

Test Conditions

Temperature: 23° C., −30° C.

Specimen: 12.7 mm (width)×6.4 mm (thickness)×127 mm (length), notched by machining (8) Charpy Impact Strength JIS Small Specimen Charpy impact test (kJ/m$^2$) was carried out under the following conditions in accordance with JIS K7111.

Test Conditions

Temperature: 23° C., −30° C.

Specimen: 10 mm (width)×4 mm (thickness)×80 mm (length), notched by machining (9) Tensile Elongation at Break ASTM Specimen Tensile elongation at break (EL, (%)) was measured in accordance with ASTM D638.

Measuring Conditions

Specimen: ASTM No. 1 dumbbell 19 mm (width)×3.2 mm (thickness)×165 mm (length)

Pulling rate: 50 mm/min

Span length: 115 mm

JIS Small Specimen

Tensile elongation at break (EL, (%)) was measured in accordance with JIS K7162-BA.

Measuring Conditions

Specimen: JIS K7162-BA dumbbell 5 mm (width)×2 mm (thickness)×75 mm (length)

Pulling rate: 20 mm/min

Span length: 58 mm

(10) Heat distortion temperature

ASTM Specimen

Heat distortion temperature (HDT, (° C.)) was measured in accordance with ASTM D648.

Test Conditions

Specimen: 12.7 mm (width)×6.4 mm (thickness)×127 mm (length)

Load: 0.45 MPa

Thickness of specimen: ¼ inch

JIS Small Specimen

Heat distortion temperature (HDT, (° C.)) was measured under the following conditions in accordance with JIS K7191.

Measuring Conditions

Specimen: 10 mm (width)×4 mm (thickness)×80 mm (length)

Load: 0.45 MPa

(11) Swell

Swell was measured under the following conditions using a capillograph (manufactured by Toyo Seiki Seisaku-sho, Ltd.).

Test Conditions

Capillary length: 20 mm

Capillary diameter: 1 mm

Measuring temperature: 230° C.

Shear rate: 1216 sec$^{-1}$

(12) Appearance Flow Mark

In the evaluation of flow mark of an injection molded article, an injection mold having a gate at the center (50 mm) and capable of producing a flat plate having a length of 350 mm, a width of 100 mm and a thickness of 3 mm was used (FIG. 1). An area between the gate and a flow mark having occurred was visually evaluated.

Injection Molding Conditions for Specimen

Injection molding machine: Product number M200, manufactured by Meiki Co., Ltd.

Cylinder temperature: 210° C.

Mold temperature: 40° C.

Shape of molded article: shown in FIG. 1

Flow mark evaluation:

10 points (maximum): No flow mark occurred.

0 point: Flow marks occurred all over the surface.

(13) Fish Eye

A cast film was produced by a T-die extruder (manufactured by Shinko Machinery Co., Ltd.) having a diameter of 25 mm, and the number of fish eyes having a diameter of not less than 200 µm was measured.

Film Production

Extrusion temperature: 250° C.

Chill roll temperature: 40° C.

Film thickness: 50 µm

Screen mesh: one screen mesh #60

(14) Measurement of Solid Viscoelasticity Tan δ (° C.)

Pellets were subjected to press molding to prepare a molded article, and temperature dispersion measurement was carried out by a solid viscoelasticity measuring device. A tan δ peak temperature at not higher than −30° C. was read out as an index of a glass transition temperature of a propylene/ethylene and/or α-olefin copolymer rubber portion.

Press molding temperature: 230° C.

Measuring device: RSA-II (manufactured by TA)

Measuring mode: tensile mode (autotension and autostrain control)

Measuring temperature: −80 to 150° C. (up to measurable temperature)

Heating rate: 3° C./min

Measuring frequency: 1 Hz

Sample size: 5 mm (width)×0.4 mm (thickness)

Initial gap ($L_0$): 21.5 mm

Atmosphere: $N_2$

(15) Melt Tension

Melt tension (MT, (g)) is a value obtained by measuring a load for taking up a pulley having a function of load cell detection by the use of a melt tension measuring device (manufactured by Toyo Seiki Seisaku-sho, Ltd.) under the conditions of an orifice having L of 8.00 mm and D of 2.095 mm, a preset temperature of 230° C., a piston fall rate of 15 mm/min and a take-up rate of 15 mm/min.

(16) Measurement of Linear Expansion coefficient (MD ($\times 10^{-5}$/° C.), TD ($\times 10^{-5}$/° C.))

Measurement of linear expansion coefficient was carried out using a TMA measuring device (manufactured by TA Instruments Japan K.K., TMA2940) under the following conditions.

Measuring device: TMA2940 (manufactured by TA Instruments Japan K.K.)

Test temperature range: −40 to 110° C.

Test load: 0.029 N (3 g) (probe: about 3 mm in diameter)

Heating rate: 5° C./min

Measuring direction: MD (machine direction, direction of flow) and TD (transverse direction, vertical direction) of injection molded product Annealing treatment: none Specimen: square plate (100 mm (width)×100 mm (length)×2 mm (thickness)), small square plate (30 mm (width)×30 mm (length)×2 mm (thickness))

Example 1

Preparation of Solid Titanium Catalyst Component (α1)

75 g of anhydrous magnesium chloride, 280.3 g of decane and 308.3 g of 2-ethylhexyl alcohol were thermally reacted at 130° C. for 3 hours to give a homogenous solution, then to the solution was added 17.7 g of ethyl benzoate, and they were further stirred and mixed at 130° C. for 1 hour.

The homogeneous solution obtained as above was cooled down to room temperature, and then 38 ml of this homogeneous solution was dropwise added in the whole amount to 100 ml of titanium tetrachloride kept at −24° C.; over a period of 45 minutes with stirring at a rotational speed of 200 rpm. After the dropwise addition was completed, the temperature of this mixed solution was raised to 80° C. over a period of 4.6 hours, and when a temperature of 80° C. was reached, to the mixed solution was added diisobutyl 3,6-dimethylcyclohexane-1,2-dicarboxylate (mixture of cis isomer and trans isomer) in an amount of 0.0875 time the molar quantity of Mg atom, followed by raising the temperature again. When a temperature of 120° C. was reached, diisobutyl cyclohexane-1,2-dicarboxylate was added in an amount of 0.0625 time the molar quantity of Mg atom. Thereafter, the mixture was maintained at this temperature for 35 minutes. After the reaction was completed, the solid portion was collected by hot filtration, and this solid portion was resuspended in 100 ml of titanium tetrachloride, followed by performing thermal reaction again at 120° C. for 25 minutes. After the reaction was completed, the solid portion was collected by hot filtration again, and the solid portion was sufficiently washed with decane at 100° C. and hexane until a titanium compound liberated in the wash liquid was not detected. Although the solid titanium catalyst component (α1) prepared through the above operations was stored as a decane slurry, a part of it was dried for the purpose of examining composition of the catalyst.

The composition of the solid titanium catalyst component (α1) obtained as above was as follows: titanium: 3.0% by mass, magnesium: 18% by mass, chlorine: 58% by mass, diisobutyl 3,6-dimethylcyclohexane-1,2-dicarboxylate: 8.6% by mass, diisobutyl cyclohexane-1,2-dicarboxylate: 4.2% by mass, and 2-ethylhexyl alcohol residue: 0.6% by mass.

Prepolymerization of Solid Titanium Catalyst Component (α1)

In a three-necked flask having an internal volume of 2 liters and equipped with a stirrer, which had been purged with nitrogen, a heptane slurry containing 120 g (75.2 mmol-Ti) of the solid titanium catalyst component (α1) was introduced, and to the slurry was added dehydrated heptane to give a total amount of 1 liter. The resulting mixture was stirred with controlling its temperature to not higher than 20° C., and 226 mmol of triethylaluminum was added. With maintaining the temperature at 20° C., the mixture was allowed to absorb a given amount of propylene for 120 minutes, and the residual propylene was replaced with nitrogen. Using heptane, washing was sufficiently carried out to obtain 1.3 kg of a prepolymerized catalyst component (10 g-PP/g-solid titanium catalyst component).

Polymerization

To a loop polymerizer having an internal volume of 56 liters were continuously fed propylene at 43 kg/hr, hydrogen at 160 NL/hr, the catalyst slurry at 0.50 g/hr in terms of the solid catalyst component, triethylaluminum at 2.16 ml/hr and dicyclopentyldimethoxysilane at 2.2 ml/hr, and polymerization was carried out in a state where the polymerizer was full of a liquid without gas phase. The temperature of the loop reactor was 70° C., and the pressure was 3.5 MPa/G.

The resulting slurry was fed to a Bessel polymerizer having an internal volume of 100 liters and equipped with a stirrer, and polymerization was further carried out. To the polymerizer were fed propylene at 30 kg/hr and hydrogen at 180 NL/hr. The polymerization was carried out at a polymerization temperature of 70° C. and a pressure of 3.3 MPa/G.

The resulting slurry was transferred into a meter pipe having an internal volume of 2.4 liters, and a polyoxyethylene polyoxypropylene glycol compound was added in an amount of 20% by weight based on the transition metal solid component. The slurry was gasified, and gas-solid separation was carried out. Thereafter, a polypropylene homopolymer powder was fed to a gas phase polymerizer of 480 liters to perform ethylene/propylene block copolymerization. To the gas phase polymerizer were continuously fed propylene, ethylene and hydrogen so that gas composition of ethylene/(ethylene+propylene)=0.40 (molar ratio) and hydrogen/(ethylene+propylene)=0.53 (molar ratio) in the gas phase polymerizer would be obtained. The polymerization was carried put under the conditions of a polymerization temperature of 70° C., a pressure of 0.73 MPa/G and a residence time of 0.63 hour to obtain a propylene-based block copolymer (A-1). The amount of the room temperature n-decane-soluble portion (Dsol) was 11.5% by weight, and the amount of the room temperature n-decane-insoluble portion (Dinsol) was 88.5% by weight.

Figure 2:
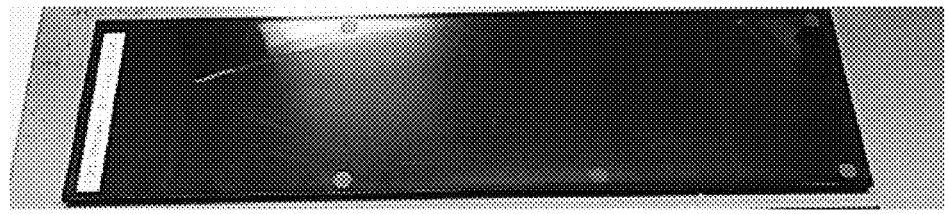
FIG. 2 is a view of a specimen for appearance flow mark test of an injection molded article, said specimen being obtained from a propylene-based block copolymer of Example 1 (appearance flow mark evaluation: 9.5 points).

Molding 100 Parts by weight of the propylene-based block copolymer (A-1) was mixed with 0.1 part by weight of a heat stabilizer IRGANOX 1010 (trademark, available from Ciba Japan K.K.), 0.1 part by weight of a heat stabilizer IRGAFOS168 (trademark, available from Ciba Japan K.K.), 0.1 part by weight of a heat stabilizer IRGANOX 1076 (trademark, available from Ciba Japan K.K.) and 0.1 part by weight of calcium stearate by a tumbler, then the mixture was melt kneaded by a twin-screw extruder to prepare pellets of a polypropylene resin composition, and from the pellets, specimens (ASTM specimens, square plates for measurement of linear expansion coefficient) were prepared by an injection molding machine. Evaluation results of properties of the molded article, appearance of the injection molded article and injection molding fluidity are set forth in Table 1. A photograph of the injection molded product used for flow mark evaluation is shown in FIG. 2.

Melt Kneading Conditions
Co-rotating twin-screw kneader: product number NR2-36, manufactured by Nakatani Kikai Co., Ltd.
Kneading temperature: 230° C.
Screw rotational speed: 200 rpm
Feeder rotational speed: 500 rpm
In the hopper, there was a flow of nitrogen.

Injection Molding Conditions for ASTM Specimen
Injection molding machine: product number EC40, manufactured by Toshiba Machine Co., Ltd.
Cylinder temperature: 230° C.
Mold temperature: 40° C.

Injection Molding Conditions for Square Plate for Measurement of Linear Expansion Coefficient
Injection molding machine: product number AUTOSHOT T series MODEL 100D, manufactured by FANUC CORPORATION
Cylinder temperature: 230° C.
Mold temperature: 40° C.
Specimen: square plate (100 mm×100 mm×2 mm)

Comparative Example 1

Preparation of Solid Titanium Catalyst Component ($\beta$1)

75 g of anhydrous magnesium chloride, 280.3 g of decane and 308.3 g of 2-ethylhexyl alcohol were thermally reacted at 130° C. for 3 hours to give a homogenous solution, then to the solution was added 17.7 g of ethyl benzoate, and they were further stirred and mixed at 130° C. for 1 hour.

The homogeneous solution obtained as above was cooled down to room temperature, and then 38 ml of this homogeneous solution was dropwise added in the whole amount to 100 ml of titanium tetrachloride kept at −24° C., over a period of 45 minutes with stirring at a rotational speed of 200 rpm. After the dropwise addition was completed, the temperature of this mixed solution was raised to 110° C. over a period of 5.1 hours, and when a temperature of 110° C. was reached, to the mixed solution was added diisobutyl cyclohexane-1,2-dicarboxylate (mixture of cis isomer and trans isomer) in an amount of 0.15 time the molar quantity of Mg atom. Thereafter, the mixture was maintained at this temperature for 35 minutes. After the reaction was completed, the solid portion was collected by hot filtration, and this solid portion was resuspended in 100 ml of titanium tetrachloride, followed by performing thermal reaction again at 110° C. for 35 minutes. After the reaction was completed, the solid portion was collected by hot filtration again, and the solid portion was sufficiently washed with decane at 100° C. and hexane until a titanium compound liberated in the wash liquid was not detected. Although the solid titanium catalyst component ($\beta$1) prepared through the above operations was stored as a decane slurry, a part of it was dried for the purpose of examining composition of the catalyst.

The composition of the solid titanium catalyst component ($\beta$1) obtained as above was as follows: titanium: 2.6% by mass, magnesium: 18% by mass, diisobutyl cyclohexane-1, 2-dicarboxylate: 21.2% by mass, and 2-ethylhexyl alcohol residue: 0.6% by mass.

Prepolymerization of Solid Titanium Catalyst Component ($\beta$1)

In a three-necked flask having an internal volume of 2 liters and equipped with a stirrer, which had been purged with nitrogen, a heptane slurry containing 120 g (60.1 mmol-Ti) of the solid titanium catalyst component ($\beta$1) was introduced, and to the slurry was added dehydrated heptane to give a total amount of 1 liter. The resulting mixture was stirred with controlling its temperature to not higher than 20° C., and 180 mmol of triethylaluminum was added. With maintaining the temperature at 20° C., the mixture was allowed to absorb a given amount of propylene for 120 minutes, and the residual propylene was replaced with nitrogen. Using heptane, washing was sufficiently carried out to obtain 1.3 kg of a prepolymerized catalyst component (10 g-PP/g-solid titanium catalyst component).

Polymerization

To a loop polymer having an internal volume of 58 liters were continuously fed propylene at 43 kg/hr, hydrogen at 140 NL/hr, the catalyst slurry at 0.87 g/hr in terms of the solid catalyst component, triethylaluminum at 2.94 ml/hr and dicyclopentyldimethoxysilane at 3.2 ml/hr, and polymerization was carried out in a state where the polymerizer was full of a liquid without gas phase. The temperature of the loop reactor was 70° C., and the pressure was 3.5 MPa/G.

The resulting slurry was fed to a Bessel polymerizer having an internal volume of 100 liters and equipped with a stirrer, and polymerization was further carried out. To the polymerizer were fed propylene at 30 kg/hr and hydrogen at 170 NL/hr. The polymerization was carried out at a polymerization temperature of 70° C. and a pressure of 3.3 MPa/G.

The resulting slurry was transferred into a meter pipe having an internal volume of 2.4 liters, and a polyoxyethylene polyoxypropylene glycol compound was added in an amount of 20% by weight based on the transition metal solid component. The slurry was gasified, and gas-solid separation was carried out. Thereafter, a polypropylene homopolymer powder was fed to a gas phase polymerizer of 480 liters to perform ethylene/propylene block copolymerization. To the gas phase polymerizer were continuously fed propylene, ethylene and hydrogen so that gas composition of ethylene/(ethylene+propylene)=0.40 (molar ratio) and hydrogen/(ethylene+propylene)=0.095 (molar ratio) in the gas phase polymerizer would be obtained. The polymerization was carried out under the conditions of a polymerization temperature of 70° C., a pressure of 0.83 MPa/G and a residence time of 0.51 hour to obtain a propylene-based block copolymer (A'-1).

Molding
The propylene-based block copolymer (A'-1) was molded in the same manner as in Example 1. Evaluation results of properties of the molded article, appearance of the Injection molded article and injection molding fluidity are set forth in Table 1.

Comparative Example 2

Preparation of Solid Titanium Catalyst Component ($\beta$2)

75 g of anhydrous magnesium chloride, 280.3 g of decane and 308.3 g of 2-ethylhexyl alcohol were thermally reacted at 130° C. for 3 hours to give a homogenous solution, then to the solution was added 17.5 g of phthalic anhydride, and they were further stirred and mixed at 130° C. for 1 hour.

The homogeneous solution obtained as above was cooled down to room temperature, and then 38 ml of this homogeneous solution was dropwise added in the whole amount to 100 ml of titanium tetrachloride kept at −24° C., over a period of 45 minutes with stirring at a rotational speed of 200 rpm. After the dropwise addition was completed, the temperature of this mixed solution was raised to 110° C. over a period of 5.1 hours, and when a temperature of 110° C. was reached, to the mixed solution was added diisobutyl phthalate in an amount of 0.25 time the molar quantity of Mg atom. Thereafter, the mixture was maintained at this temperature for 120 minutes. After the reaction was completed, the solid portion was collected by hot filtration, and, this solid portion was resuspended in 100 ml of titanium tetrachloride, followed by performing thermal reaction again at 110° C. for 120 minutes. After the reaction was completed, the solid portion was collected by hot filtration again, and the solid portion was sufficiently washed with decane at 100° C. and hexane until a titanium compound liberated in the wash liquid was not detected. Although the solid titanium catalyst component (β2) prepared through the above operations was stored as a decane slurry, a part of it was dried for the purpose of examining composition of the catalyst. The composition of the solid titanium catalyst component ((2) obtained as above was as follows: titanium: 2.4% by mass, magnesium: 18% by mass, diisobutyl phthalate: 15.4% by mass, and 2-ethylhexyl alcohol residue: 1.2% by mass.

Prepolymerization of Solid Titanium Catalyst Component (β2)

In a three-necked flask having an internal volume of 2 liters and equipped with a stirrer, which had been purged with nitrogen, a heptane slurry containing 120 g (65.1 mmol-Ti) of the solid titanium catalyst component was introduced, and to the slurry was added dehydrated heptane to give a total amount of 1 liter. The resulting mixture was stirred with controlling its temperature to not higher than 20° C., and 195 mmol of triethylaluminum was added. With maintaining the temperature at 20° C., the mixture was allowed to absorb a given amount of propylene for 120 minutes, and the residual propylene was replaced with nitrogen. Using heptane, washing was sufficiently carried out to obtain 1.3 kg of a prepolymerized catalyst component (10 g-PP/g-solid titanium catalyst component).

Polymerization

To a loop polymerizer having an internal volume of 58 liters were continuously fed propylene at 42 kg/hr, hydrogen at 135 NL/hr, the catalyst slurry at 0.99 g/hr in terms of the solid catalyst component, triethylaluminum at 3.87 ml/hr and dicyclopentyldimethoxysilane at 4.05 ml/hr, and polymerization was carried out in a state where the polymerizer was full of a liquid without gas phase. The temperature of the loop reactor was 70° C., and the pressure was 3.5 MPa/G.

The resulting slurry was fed to a Bessel polymerizer having an internal volume of 100 liters and equipped with a stirrer, and polymerization was further carried out. To the polymerizer were fed propylene at 30 kg/hr and hydrogen at 143NL/hr. The polymerization was carried out at a polymerization temperature of 70° C. and a pressure of 3.2 MPa/G.

The resulting slurry was transferred into a meter pipe having an internal volume of 2.4 liters, and a polyoxyethylene polyoxypropylene glycol compound was added in an amount of 20% by weight based on the transition metal solid component. The slurry was gasified, and gas-solid separation was carried out. Thereafter, a polypropylene homopolymer powder was fed to a gas phase polymerizer of 480 liters to perform ethylene/propylene block copolymerization. To the gas phase polymerizer were continuously fed propylene, ethylene and hydrogen so that gas composition of ethylene/(ethylene+propylene)=0.392 (molar ratio) and hydrogen/(ethylene+propylene)=0.0521 (molar ratio) in the gas phase polymerizer would be obtained. The polymerization was carried out under the conditions of a polymerization temperature of 70° C., a pressure of 0.96 MPa/G and a residence time of 0.55 hour to obtain a propylene-based block copolymer (A'-2).

Molding

Figure 3:
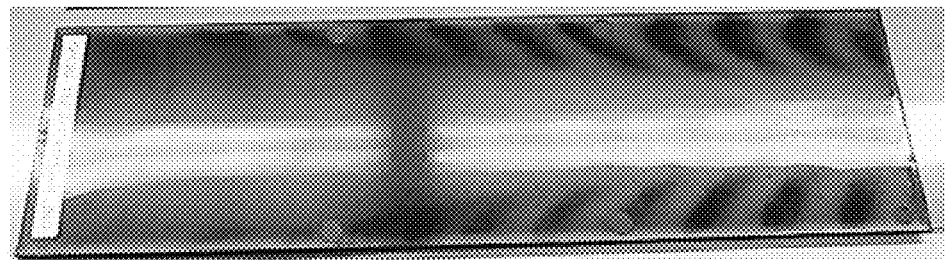
FIG. 3 is a view of a specimen for appearance flow mark test of an injection molded article, said specimen being obtained from a propylene-based block copolymer of Comparative Example 2 (appearance flow mark evaluation: 3.0 points).

The propylene-based block copolymer (A'-2) was molded in the same manner as in Example 1. Evaluation results of properties of the molded article, appearance of the injection molded article and injection molding fluidity are set forth in Table 1. A photograph of the injection molded product used for flow mark evaluation is shown in FIG. 3.

Example 2

Using the solid titanium catalyst component (α1), polymerization was carried out in the same manner as in Example 1, except that the residence time of the polymerization conditions in the gas phase polymerizer was changed to 0.47 hour. Thus, a propylene-based block copolymer (A-2) was obtained. The amount of the room temperature n-decane-soluble portion (Dsol) was 8.6% by weight, and the amount of the room temperature n-decane-insoluble portion (Dinsol) was 91.4% by weight.

Molding

The propylene-based block copolymer (A-2) was molded into ASTM specimens in the same manner as in Example 1. Evaluation results of properties of the molded article, appearance of the injection molded article and injection molding fluidity are set forth in Table 2.

Comparative Example 3

Using the solid titanium catalyst component (β1), polymerization was carried out in the same manner as in Comparative Example 1, except that the residence time of the polymerization conditions in the gas phase polymerizer was changed to 0.37 hour. Thus, a propylene-based block copolymer (A'-3) was obtained.

Molding

The propylene-based block copolymer (A'-3) was molded into ASTM specimens in the same manner as in Example 1. Evaluation results of properties of the molded article, appearance of the injection molded article and injection molding fluidity are set forth in Table 2.

Comparative Example 4

Using the solid titanium catalyst component (β2), polymerization was carried out in the same manner as in Comparative Example 2, except that the residence time of the polymerization conditions in the gas phase polymerizer was changed to 0.41 hour. Thus, a propylene-based block copolymer (A'-4) was obtained.

Molding

The propylene-based block copolymer (A'-4) was molded into ASTM specimens in the same manner as in Example 1. Evaluation results of properties of the molded article, appearance of the injection molded article and injection molding fluidity are set forth in Table 2.

Example 3

Using the solid titanium catalyst component (α1), polymerization was carried out in the same manner as in Example 1, except that the residence time of the polymerization conditions in the gas phase polymerizer was changed to 0.32 hour. Thus, a propylene-based block copolymer (A-3) was obtained. The amount of the room temperature n-decane-soluble portion (Dsol) was 5.9% by weight, and the amount of the room temperature n-decane-insoluble portion (Dinsol) was 94.1% by weight.

Molding

The propylene-based block copolymer (A-3) was molded into ASTM specimens in the same manner as in Example 1. Evaluation results of properties of the molded article, appearance of the injection molded article and injection molding fluidity are set forth in Table 3.

Comparative Example 5

Using the solid titanium catalyst component (β1), polymerization was carried out in the same manner as in Comparative Example 1, except that the residence time of the polymerization conditions in the gas phase polymerizer was changed to 0.26 hour. Thus, a propylene-based block copolymer (A'-5) was obtained.

Molding

The propylene-based block copolymer (A'-5) was molded into ASTM specimens in the same manner as in Example 1. Evaluation results of properties of the molded article, appearance of the injection molded article and injection molding fluidity are set forth in Table 3.

Comparative Example 6

Using the solid titanium catalyst component (β2), polymerization was carried out in the same manner as in Comparative Example 2, except that the residence time of the polymerization conditions in the gas phase polymerizer was changed to 0.28 hour. Thus, a propylene-based block copolymer (A'-6) was obtained.

Molding

The propylene-based block copolymer (A'-6) was molded into

ASTM specimens in the same manner as in Example 1. Evaluation results of properties of the molded article, appearance of the injection molded article and injection molding fluidity are set forth in Table 3.

Example 4

100 Parts by weight of the propylene-based block copolymer (A-1) prepared in Example 1 was mixed with 0.3 part by weight of a crystal nucleating agent ADEKASTAB NA21 (trademark, available from Asahi Denka Kogyo K.K.), 0.1 part by weight of a heat stabilizer IRGANOX 1010 (trademark, available from Ciba-Geigy K.K.), 0.1 part by weight of a heat stabilizer IRGAFOS168 (trademark, available from Ciba-Geigy K.K.), 0.1 part by weight of a heat stabilizer IRGANOX 1076 (trademark, available from Ciba-Geigy K.K.) and 0.1 part by weight of calcium stearate by a tumbler. Thereafter, the mixture was melt kneaded by a twin-screw extruder in the same manner as in Example 1 to prepare pellets of a polypropylene resin composition, and from the pellets, specimens were prepared by an injection molding machine in the same manner as in Example 1. Mechanical properties and appearance of the molded article are set forth in Table 4.

Comparative Example 7

Specimens were prepared in the same manner as in Example 4, except that 100 parts by weight of the propylene-based block copolymer (A'-1) prepared in Comparative Example 1 were used instead of 100 parts by weight of the propylene-based block copolymer (A-1). Mechanical properties and appearance of the molded article are set forth in Table 4.

Comparative Example 8

Specimens were prepared in the same manner as in Example 4, except that 100 parts by weight of the propylene-based block copolymer (A'-2) prepared in Comparative Example 2 were used instead of 100 parts by weight of the propylene-based block copolymer (A-1). Mechanical properties and appearance of the molded article are set forth in Table 4.

Example 5

60 Parts by weight of the propylene-based block copolymer (A-1) prepared in Example 1, 20 parts by weight of an ethylene/butene copolymer rubber (Toughmer A1050 (trademark), available from Mitsui Chemicals, Inc.), 20 parts by weight of talc (White Filler 5000 PJ (trademark), available from Matsumura Sangyo Co., Ltd.), 0.1 part by weight of a heat stabilizer IRGANOX 1010 (trademark, available from Ciba-Geigy K.K.), 0.1 part by weight of a heat stabilizer IRGAFOS168 (trademark, available from Ciba-Geigy K.K.), 0.1 part by weight of a heat stabilizer IRGANOX 1076 (trademark, available from Ciba-Geigy K.K.) and 0.1 part by weight of calcium stearate were mixed by a tumbler. Thereafter, the mixture was melt kneaded by a twin-screw extruder in the same manner as in Example 1 to prepare pellets of a polypropylene resin composition, and from the pellets, specimens (ASTM specimens, square plates for measurement of linear expansion coefficient) were prepared by an injection molding machine in the same manner as in Example 1. Mechanical properties and appearance of the molded article are set forth in Table 5.

Comparative Example 9

Specimens were prepared in the same manner as in Example 5, except that 60 parts by weight of the propylene-based block copolymer (A'-1) prepared in Comparative Example 1 were used instead of 60 parts by weight of the propylene-based block copolymer (A-1). Mechanical properties and appearance of the molded article are set forth in Table 5.

Comparative Example 10

Specimens were prepared in the same manner as in Example 5, except that 60 parts by weight of the propylene-based block copolymer (A'-2) prepared in Comparative Example 2 were used instead of 60 parts by weight of the propylene-based block copolymer (A-1). Mechanical properties and appearance of the molded article are set forth in Table 5.

Example 6

Preparation of Solid Titanium Catalyst Component (α2)

A high-speed stirring device (manufactured by Tokushu Kika Kogyo Co., Ltd., TK homomixer M model) having an internal volume of 2 liters was thoroughly purged with nitrogen. Thereafter, in this device were placed 700 ml of purified decane, 10 g of commercially available magnesium chloride, 24.2 g of ethanol and 3 g of Rheodol SP-S20 (trade name, sorbitan distearate available from Kao Corporation). With stirring the resulting suspension, the temperature of the system was raised, and the suspension was stirred at 800 rpm for 30 minutes at 120° C. Subsequently, with stirring the suspension at a high speed so that any precipitate should not be formed, the suspension was transferred, by the use of a Teflon (registered trademark) tube having an inner diameter of 5 mm, into a 2-liter glass flask (equipped with a stirrer) in which 1 liter of purified decane cooled to −10° C. had been placed in advance. The solid formed by the transfer of liquid was filtered off and sufficiently washed with purified n-heptane to obtain a solid adduct wherein ethanol had been coordinated in an amount of 2.8 mol based on 1 mol of magnesium chloride. This solid adduct was suspended in decane, and in 100 ml of titanium tetrachloride kept at −20° C., the solid adduct in an amount of 23 mmol in terms of magnesium atom was introduced with stirring, to obtain a mixed solution. The temperature of this mixed solution was raised to 80° C. over a period of 5 hours, and when a temperature of 80° C. was reached, to the mixed solution was added diisobutyl 3,6-dimethylcyclohexane-1,2-dicarboxylate (mixture of cis isomer and trans isomer) in an amount of 0.085 mol based on 1 mol of magnesium atom in the solid adduct, followed by raising the temperature up to 110° C. over a period of 40 minutes. When a temperature of 110° C. was reached, diisobutyl cyclohexane-1,2-dicarboxylate (mixture of cis isomer and trans isomer) was added in an amount of 0.0625 mol based on 1 mol of magnesium atom in the solid adduct, and with stirring, they were kept at 110° C. for 90 minutes to react them.

After the reaction of 90 minutes was completed, the solid portion was collected by hot filtration, and this solid portion was resuspended in 100 ml of titanium tetrachloride, followed by raising the temperature. After a temperature of 110° C. was reached, the suspension was held for 45 minutes with stirring and thereby reacted. After the reaction of 45 minutes was completed, the solid portion was collected by hot filtration again, and the solid portion was sufficiently washed with decane at 100° C. and heptane until a titanium compound liberated in the wash liquid was not detected.

Although the solid titanium catalyst component (α2) prepared through the above operations was stored as a decane slurry, a part of it was dried for the purpose of examining composition of the catalyst.

The composition of the solid titanium catalyst component (α2) obtained as above was as follows: titanium: 3.2% by mass, magnesium: 17% by mass, chlorine: 57% by mass, diisobutyl 3,6-dimethylcyclohexane-1,2-dicarboxylate: 10.6% by mass, diisobutyl cyclohexane-1,2-dicarboxylate: 8.9% by mass, and ethyl alcohol residue: 0.6% by mass.

Prepolymerization of Solid Titanium Catalyst Component (α2)

In a three-necked flask having an internal volume of 200 ml and equipped with a stirrer, which had been purged with nitrogen, dehydrated hexane was placed, then 0.75 mmol of triethylaluminum was introduced, and the above suspension of the solid titanium catalyst component (α2) was further introduced in an amount of 0.25 mmol in terms of titanium atom to give a total amount of 50 ml. With stirring, the mixture was maintained at 20° C. and allowed to absorb a given amount of propylene for 60 minutes. Thereafter, the residual propylene was replaced with nitrogen, and using hexane, washing was sufficiently carried out to obtain a prepolymerized catalyst component (3 g-PP/g-solid titanium catalyst component).

Polymerization

In a polymerizer having an internal volume of 2 liters, 500 g of propylene and 6 NL of hydrogen were placed at room temperature. Thereafter, 0.75 mmol of triethylaluminum, 0.025 mmol of cyclohexylmethyldimethoxysilane and 0.0054 mmol (in terms of titanium atom) of the solid titanium catalyst component (α2) were added, and the temperature in the polymerizer was rapidly raised up to 70° C. After polymerization was carried out for 20 minutes at 70° C., propylene, was purged off with lowering the temperature. Thereafter, replacement with nitrogen was repeated several times. After 0.04 NL of hydrogen was added, a mixed gas of ethylene/(ethylene+propylene)=43% by mol was used to give a total pressure of 0.4 MPa, and at this total pressure, copolymerization was carried out in a gas phase. The polymerization was continued until a rubber (Dsol) quantity of about 18% was reached. After the reaction was completed, a small amount of methanol was added to terminate the reaction, and propylene was purged off. The resulting polymer particles were vacuum dried at room temperature for one night to obtain a propylene-based block copolymer (A-4). The amount of the room temperature n-decane-soluble portion (Dsol) was 18.4% by weight, and the amount of the room temperature n-decane-insoluble portion (Dinsol) was 81.6% by weight.

Molding

100 Parts by weight of the propylene-based block copolymer (A-4), 0.1 part by weight of a heat stabilizer IRGANOX 1010 (trademark, available from Ciba Japan K.K.), 0.1 part by weight of a heat stabilizer IRGAFOS168 (trademark, available from Ciba Japan K.K.), 0.1 part by weight of a heat stabilizer IRGANOX 1076 (trademark, available from Ciba Japan K.K.) and 0.1 part by weight of calcium stearate were blended, and then the blend was melt kneaded by a single screw extruder under the following conditions to prepare pellets. From the resulting pellets, JIS small specimens and small square plates were produced by an injection molding machine (product number: EC40, manufactured by Toshiba Machine Co., Ltd.) under the following conditions.

Properties of the molded article are set forth in Table 6.

Melt Kneading Conditions

Single screw kneader: product number Laboplasto Mill 10M100, manufactured by Toyo Seiki Seisaku-sho, Ltd.

Kneading temperature: 210° C.

Screw rotational speed: 60 rpm

In the hopper, there was a flow of nitrogen.

Injection Molding Conditions

Injection molding machine: product number EC40, manufactured by Toshiba Machine Co., Ltd.

Cylinder temperature: 190° C.

Mold temperature: 40° C.

The JIS small specimens and the small square plates were produced by a family mold.

Example 7

Polymerization

Using the solid titanium catalyst component (α2), polymerization was carried out in the same manner as in Example 6, except that the period of time for copolymerization in a gas phase was extended until a rubber (Dsol) quantity of about 25% was reached. The resulting polymer particles were vacuum dried at room temperature for one night to obtain a propylene-based block copolymer (A-5). The amount of the room temperature n-decane-soluble portion (Dsol) was 24.1% by weight, and the amount of the room temperature n-decane-insoluble portion (Dinsol) was 75.9% by weight.

Molding

The propylene-based block copolymer (A-5) was subjected to blending, granulation and injection molding in the same manner as in Example 6. Properties of the molded article are set forth in Table 6.

Example 8

Polymerization

Using the solid titanium catalyst component (α2), polymerization was carried out in the same manner as in Example 6, except that addition of hydrogen in a gas phase was not carried out. The resulting polymer particles were vacuum dried at room temperature for one night to obtain a propylene-based block copolymer (A-6). The amount of the room temperature n-decane-soluble portion (Dsol) was 17.6% by weight, and the amount of the room temperature n-decane-insoluble portion (Dinsol) was 82.4% by weight.

Molding

The propylene-based block copolymer (A-6) was subjected to blending, granulation and injection molding in the same manner as in Example 6. Properties of the molded article are set forth in Table 6.

Comparative Example 11

Preparation of Solid Titanium Catalyst Component (β3)

A high-speed stirring device (manufactured by Tokushu Kika Kogyo Co., Ltd., TK homomixer M model) having an internal volume of 2 liters was thoroughly purged with nitrogen. Thereafter, in this device were placed 700 ml of purified decane, 10 g of commercially available magnesium chloride, 24.2 g of ethanol and 3 g of Rheodol SP-S20 (trade name, sorbitan distearate available from Kao Corporation). With stirring the resulting suspension, the temperature of the system was raised, and the suspension was stirred at 800 rpm for 30 minutes at 120° C. Subsequently, with stirring the suspension at a high speed so that any precipitate should not be formed, the suspension was transferred, by the use of a Teflon (registered trademark) tube having an inner diameter of 5 mm, into a 2-liter glass flask (equipped with a stirrer) in which 1 liter of purified decane cooled to −10° C. had been placed in advance. The solid formed by the transfer of liquid was filtered off and sufficiently washed with purified n-heptane to obtain a solid adduct wherein ethanol had been coordinated in an amount of 2.8 mol based on 1 mol of magnesium chloride. This solid adduct was suspended in decane, and in 100 ml of titanium tetrachloride kept at −20° C., the solid adduct in an amount of 23 mmol in terms of magnesium atom was introduced with stirring, to obtain a mixed solution. The temperature of this mixed solution was raised to 80° C. over a period of 5 hours, and when a temperature of 80° C. was reached, to the mixed solution was added diisobutyl phthalate in an amount of 0.15 mol based on 1 mol of magnesium atom in the solid adduct, followed by raising the temperature to 120° C. over a period of 40 minutes. With stirring, they were kept at a temperature of 120° C. for 90 minutes to react them.

After the reaction of 90 minutes was completed, the solid portion was collected by hot filtration, and this solid portion was resuspended in 100 ml of titanium tetrachloride, followed by raising the temperature. After a temperature of 130° C. was reached, the suspension was held for 45 minutes with stirring and thereby reacted. After the reaction of 45 minutes was completed, the solid portion was collected by hot filtration again, and the solid portion was sufficiently washed with decane at 100° C. and heptane until a titanium compound liberated in the wash liquid was not detected.

Although the solid titanium catalyst component (β3) prepared through the above operations was stored as a decane slurry, a part of it was dried for the purpose of examining composition of the catalyst.

The composition of the solid titanium catalyst component (β3) obtained as above was as follows: titanium: 2.5% by mass, magnesium: 20% by mass, chlorine: 58% by mass, diisobutyl phthalate: 9.5% by mass, and ethyl alcohol residue: 0.1% by mass.

Prepolymerization of Solid Titanium Catalyst Component (β3)

In a three-necked flask having an internal volume of 200 ml and equipped with a stirrer, which had been purged with nitrogen, dehydrated hexane was placed, then 0.75 mmol of triethylaluminum was introduced, and the above suspension of the solid titanium catalyst component (β3) was further introduced in an amount of 0.25 mmol in terms of titanium atom to give a total amount of 50 ml. With stirring, the mixture was maintained at 20° C. and allowed to absorb a given amount of propylene for 60 minutes. Thereafter, the residual propylene was replaced with nitrogen, and using hexane, washing was sufficiently carried out to obtain a prepolymerized catalyst component (3 g-PP/g-solid titanium catalyst component).

Polymerization

In a polymerizer having an internal volume of 2 liters, 500 g of propylene and 5.3 NL of hydrogen were placed at room temperature. Thereafter, 0.84 mmol of triethylaluminum, 0.028 mmol of cyclohexylmethyldimethoxysilane and 0.0054 mmol (in terms of titanium atom) of the solid titanium catalyst component (β3) were added, and the temperature in the polymerizer was rapidly raised up to 70° C. After polymerization was carried out for 20 minutes at 70° C., propylene was purged off with lowering the temperature. Thereafter, replacement with nitrogen was repeated several times. After 0.04 NL of hydrogen was added, a mixed gas of ethylene/(ethylene+propylene)=43% by mol was used to give a total pressure of 0.4 MPa, and at this total pressure, copolymerization was carried out in a gas phase. The polymerization was continued until a rubber (Dsol) quantity of about 18% by weight was reached. After the reaction was completed, a small amount of methanol was added to terminate the reaction, and propylene was purged off. The resulting polymer particles were vacuum dried at room temperature for one night to obtain a propylene-based block copolymer (A'-7).

Molding

The propylene-based block copolymer (A'-7) was subjected to blending, granulation and injection molding in the same manner as in Example 6. Properties of the molded article are set forth in Table 6.

Comparative Example 12

Polymerization

Using the solid titanium catalyst component (β3), polymerization was carried out in the same manner as in Example 6, except that addition of hydrogen in a gas phase was not carried out. The resulting polymer particles were vacuum dried at room temperature for one night to obtain a propylene-based block copolymer (A'-8).

Molding

The propylene-based block copolymer (A'-8) was subjected to blending, granulation and injection molding in the same manner as in Example 6. Properties of the molded article are set forth in Table 6.

TABLE 1

|  |  |  | Ex. 1 | Comp. Ex. 2 | Comp. Ex. 3 |
|---|---|---|---|---|---|
| Propylene-based block copolymer |  |  | A-1 | A'-1 | A'-2 |
| $D_{insol}$ | mmmm | % | 97.4 | 97.6 | 97.5 |
|  | Mw/Mn |  | 12.6 | 7.8 | 6.7 |
|  | Mz/Mw |  | 9.0 | 5.8 | 5.1 |
|  | Mz/Mn |  | 113.4 | 45.2 | 34.2 |
| $D_{sol}$ | Amount | wt % | 11.5 | 11.6 | 12 |
|  | Ethylene content | mol % | 46 | 46 | 46 |
|  | [η] | dL/g | 3.6 | 3.2 | 3.8 |
|  | Mw/Mn |  | 8.3 | 6.1 | 6.1 |
|  | Mz/Mw |  | 3.9 | 3.7 | 3.8 |
| Homo-PP portion | MFR | g/10 min | 16 | 15 | 14 |
|  | Mw/Mn |  | 11.9 | 7.9 | 6.8 |
|  | Mz/Mw |  | 7.4 | 4.9 | 4.4 |
| Product | MFR | g/10 min | 10 | 9 | 9 |
|  | MT | g | 0.9 | 0.7 | 0.6 |
|  | Mz/Mn |  | 88.1 | 38.7 | 29.9 |
|  | EL ASTM specimen | % | 30 | 30 | 60 |
|  | FM ASTM specimen | MPa | 1,150 | 1,130 | 1,090 |
|  | Izod ASTM specimen at 23° C. | J/m | 68 | 90 | 110 |
|  | Izod ASTM specimen at −30° C. | J/m | 26 | 22 | 22 |
|  | HDT ASTM specimen | ° C. | 115 | 111 | 109 |
|  | Swell (at 1216 s$^{-1}$) |  | 1.8 | 1.5 | 1.4 |
|  | Flow mark (degree of conspicuousness) | 10 points: no flow mark | 9.5 | 6 | 3 |
|  | Fish eye | Number of fish eyes/600 cm$^2$ | 220 | 220 | 390 |
|  | Solid viscoelasticity tan δ | ° C. | −57 | −55 | −54 |
|  | Linear expansion coefficient MD | ×10$^{-5}$/° C. | 8.4 | 9.0 | 9.7 |
|  | Linear expansion coefficient TD | ×10$^{-5}$/° C. | 12.1 | 11.8 | 11.9 |

TABLE 2

|  |  |  | Ex. 2 | Comp. Ex. 3 | Comp. Ex. 4 |
|---|---|---|---|---|---|
| Propylene-based block copolymer |  |  | A-2 | A'-3 | A'-4 |
| $D_{insol}$ | mmmm | % | 97.4 | 97.6 | 97.5 |
|  | Mw/Mn |  | 12.8 | 7.7 | 6.8 |
|  | Mz/Mw |  | 9.1 | 5.6 | 5.0 |
|  | Mz/Mn |  | 116.5 | 43.1 | 34.0 |
| $D_{sol}$ | Amount | wt % | 8.6 | 8.5 | 9.0 |
|  | Ethylene content | mol % | 46 | 46 | 46 |
|  | [η] | dL/g | 3.5 | 3.3 | 3.7 |
|  | Mw/Mn |  | 8.3 | 6.1 | 6.1 |
|  | Mz/Mw |  | 4.0 | 3.7 | 3.8 |
| Homo-PP portion | MFR | g/10 min | 9 | 9 | 8 |
|  | Mw/Mn |  | 12.0 | 7.8 | 6.6 |
|  | Mz/Mw |  | 7.5 | 4.8 | 4.2 |
| Product | MFR | g/10 min | 7 | 6 | 6 |
|  | Mz/Mn |  | 90.0 | 37.4 | 27.7 |
|  | EL ASTM specimen | % | 30 | 30 | 40 |
|  | FM ASTM specimen | MPa | 1,350 | 1,290 | 1,240 |
|  | Izod ASTM specimen at 23° C. | J/m | 52 | 65 | 77 |
|  | Izod ASTM specimen at −30° C. | J/m | 25 | 22 | 24 |
|  | HDT ASTM specimen | ° C. | 119 | 114 | 111 |
|  | Flow mark (degree of conspicuousness) | 10 points: no flow mark | 10 | 4 | 3 |

TABLE 3

| | | | Ex. 3 | Comp. Ex. 5 | Comp. Ex. 6 |
|---|---|---|---|---|---|
| Propylene-based block copolymer | | | A-3 | A'-5 | A'-6 |
| $D_{insol}$ | mmmm | % | 97.4 | 97.6 | 97.5 |
| | Mw/Mn | | 12.7 | 7.9 | 6.6 |
| | Mz/Mw | | 9.2 | 5.8 | 4.9 |
| | Mz/Mn | | 116.8 | 45.8 | 32.3 |
| $D_{sol}$ | Amount | wt % | 5.9 | 5.8 | 6.0 |
| | Ethylene content | mol % | 46 | 46 | 46 |
| | [η] | dL/g | 3.5 | 3.3 | 3.7 |
| | Mw/Mn | | 8.3 | 6.1 | 6.1 |
| | Mz/Mn | | 4.1 | 3.7 | 3.9 |
| Homo-PP portion | MFR | g/10 min | 6 | 6 | 6 |
| | Mw/Mn | | 12.1 | 7.8 | 6.8 |
| | Mz/Mw | | 7.6 | 4.9 | 4.4 |
| Product | MFR | g/10 min | 5 | 5 | 5 |
| | Mz/Mn | | 92.0 | 38.2 | 29.9 |
| | EL ASTM specimen | % | 20 | 40 | 40. |
| | FM ASTM specimen | MPa | 1,450 | 1,370 | 1,320 |
| | Izod ASTM specimen at 23° C. | J/m | 42 | 48 | 58 |
| | Izod ASTM specimen at −30° C. | J/m | 25 | 25 | 22 |
| | HDT ASTM specimen | ° C. | 120 | 120 | 115 |
| | Flow mark (degree of conspicuousness) | 10 points: no flow mark | 9 | 3 | 3 |

TABLE 4

| | | | Ex. 4 | Comp. Ex. 7 | Comp. Ex. 8 |
|---|---|---|---|---|---|
| Propylene-based block copolymer | | PHR | A-1 (100) | A'-5 (100) | A'-6 (100) |
| Crystal nucleating agent | | PHR | 0.3 | 0.3 | 0.3 |
| Product | MFR | g/10 min | 11 | 9 | 9 |
| | EL ASTM specimen | % | 20 | 30 | 30 |
| | FM ASTM specimen | MPa | 1,600 | 1,590 | 1,540 |
| | Izod ASTM specimen at 23° C. | J/m | 57 | 74 | 110 |
| | Izod ASTM specimen at −30° C. | J/m | 25 | 24 | 28 |
| | HDT ASTM specimen | ° C. | 128 | 127 | 127 |
| | Flow mark (degree of conspicuousness) | 10 points: no flow mark | 10 | 6 | 5 |

TABLE 5

| | | | Ex. 5 | Comp. Ex. 9 | Comp. Ex. 10 |
|---|---|---|---|---|---|
| Propylene-based block copolymer | | PHR | A-1 (60) | A'-1 (60) | A'-2 (60) |
| Elastomer (ethylene/butene copolymer) | | PHR | 20 | 20 | 20 |
| Inorganic filler (talc) | | PHR | 20 | 20 | 20 |
| Product | MFR | g/10 min | 6 | 6 | 6 |
| | EL ASTM specimen | % | 70 | 40 | 170 |
| | FM ASTM specimen | MPa | 1,760 | 1,730 | 1,670 |
| | Izod ASTM specimen at 23° C. | J/m | 630 | 680 | 700 |
| | Izod ASTM specimen at −30° C. | J/m | 50 | 51 | 69 |
| | HDT ASTM specimen | ° C. | 123 | 124 | 122 |
| | Flow mark (degree of conspicuousness) | 10 points: no flow mark | 4 | 2 | 1 |

TABLE 5-continued

|  |  | Ex. 5 | Comp. Ex. 9 | Comp. Ex. 10 |
|---|---|---|---|---|
| Linear expansion coefficient MD | ×10$^{-5}$/° C. | 3.5 | 3.5 | 4.5 |
| Linear expansion coefficient TD | ×10$^{-5}$/° C. | 4.2 | 4.8 | 4.9 |

TABLE 6

|  |  |  |  | Ex. 6 | Ex. 7 | Ex. 8 | Comp. Ex. 11 | Comp. Ex. 12 |
|---|---|---|---|---|---|---|---|---|
| Propylene-based block copolymer |  |  |  | A-4 | A-5 | A-6 | A'-7 | A'-8 |
| D$_{insol}$ | mmmm |  | % | 96.6 | 96.7 | 96.6 | 96.3 | 96.5 |
|  | Mw/Mn |  |  | 13.0 | 13.1 | 12.9 | 6.9 | 7.0 |
|  | Mz/Mw |  |  | 9.1 | 9.1 | 9.0 | 5.2 | 5.3 |
|  | Mz/Mn |  |  | 118.3 | 119.2 | 116.1 | 35.9 | 37.1 |
| D$_{sol}$ | Amount |  | wt % | 18.4 | 24.1 | 17.6 | 17.2 | 16.5 |
|  | Ethylene content |  | mol % | 41 | 41 | 41 | 38 | 38 |
|  | [η] |  | dL/g | 2.8 | 3.1 | 3.9 | 1.9 | 2.7 |
|  | Mw/Mn |  |  | 8.2 | 8.4 | 8.2 | 6.1 | 6.1 |
|  | Mz/Mw |  |  | 3.9 | 3.9 | 4.0 | 3.7 | 3.6 |
| Homo-PP portion | MFR |  | g/10 min | 59 | 54 | 60 | 57 | 57 |
|  | Mw/Mn |  |  | 11.0 | 10.9 | 11.1 | 6.8 | 6.8 |
|  | Mz/Mw |  |  | 7.2 | 7.3 | 7.2 | 4.9 | 4.9 |
| Product | MFR |  | g/10 min | 13 | 10 | 11 | 19 | 13 |
|  | Mz/Mn |  |  | 79.2 | 79.6 | 79.9 | 33.3 | 33.3 |
|  | EL | small TP | % | 490 | 510 | 510 | 560 | 540 |
|  | FM | small TP | MPa | 1,070 | 940 | 1,050 | 820 | 830 |
|  | Charpy impact at 23° C. | small TP | kJ/m$^2$ | 9.5 | 24.6 | 11.1 | 8.0 | 10.7 |
|  | Charpy impact at −30° C. | small TP | kJ/m$^2$ | 2.5 | 3.7 | 2.3 | 1.9 | 2.0 |
|  | HDT | small TP | ° C. | 88 | 86 | 87 | 73 | 76 |
|  | Swell (at 1216 s$^{-1}$) |  |  | 1.9 | 1.7 | 2.0 | 1.6 | 1.7 |
|  | Solid viscoelasticity tan δ |  | ° C. | −50 | −47 | −48 | −41 | −42 |
|  | Linear expansion coefficient MD | small TP | ×10$^{-5}$/° C. | 11.5 | 11.6 | 11.7 | 12.7 | 13.0 |
|  | Linear expansion coefficient TD | small TP | ×10$^{-5}$/° C. | 12.5 | 12.0 | 13.3 | 13.8 | 14.0 |

INDUSTRIAL APPLICABILITY

The propylene-based block copolymer of the present invention and the composition containing the copolymer have high melt elasticity, have excellent balance between rigidity and impact resistance and are excellent in processability, molded article appearance, molded article dimensional stability. Therefore, they can be applied to wall-thinning of automotive parts and industrial material parts and weight-lightening of various molded products, such as foam molded products and blow molded products.

The invention claimed is:

1. A propylene-based block copolymer comprising 5 to 80% by weight of a room temperature n-decane-soluble portion (Dsol) and 20 to 95% by weight of a room temperature n-decane-insoluble portion (Dinsol), with the proviso that the total amount of the Dsol and the Dinsol is 100% by weight, and satisfying the following requirements [1] to [3] at the same time:
   [1] the molecular weight distribution (Mw/Mn) of the Dsol is not less than 7.0 but not more than 30,
   [2] the molecular weight distribution (Mw/Mn) of the Dinsol is not less than 7.0 but not more than 30, and Mz/Mw thereof is not less than 6.0 but not more than 20, and
   [3] the pentad fraction (mmmm) of the Dinsol is not less than 93%,
   wherein the room temperature n-decane-soluble portion (Dsol) contains, as a main component, a copolymer rubber comprising propylene and one or more olefins selected from ethylene and α-olefins of 4 to 20 carbon atoms, and
   the room temperature n-decane-insoluble portion (Dinsol) contains, as a main component, a crystalline propylene-based (co)polymer comprising 98.5 to 100% by mol of propylene and 0 to 1.5% by mol of one or more olefins selected from ethylene and α-olefins of 4 to 20 carbon atoms.

2. The propylene-based block copolymer as claimed in claim 1, which further satisfies the following requirement [4]:
   [4] the intrinsic viscosity [η] (dL/g) of the Dsol is not less than 1.5 but not more than 10.0.

3. The propylene-based block copolymer as claimed in claim 1, which further satisfies the following requirement [5]:
   [5] Mz/Mn of the Dinsol is not less than 70 but not more than 300.

4. The propylene-based block copolymer as claimed in claim 1, wherein the copolymer rubber is obtained by copolymerizing propylene and one or more olefins selected from ethylene and α-olefins of 4 to 20 carbon atoms in one stage.

5. The propylene-based block copolymer as claimed in claim 1, which is obtained by polymerizing olefins containing propylene in the presence of an olefin polymerization catalyst comprising:
   a solid titanium catalyst component (I) containing titanium, magnesium, halogen, a cyclic ester compound (a)

represented by the following formula (1) and a cyclic ester compound (b) represented by the following formula (2), an organometallic compound (II) containing a metal atom selected from Group 1, Group 2 and Group 13 of the periodic table, and if necessary, an electron donor (III);

[Chem. 1]

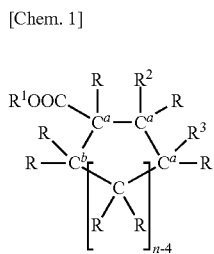

(1)

wherein n is an integer of 5 to 10,
$R^2$ and $R^3$ are each independently $COOR^1$ or R, at least one of $R^2$ and $R^3$ is $COOR^1$, and single bonds ($C—C^b$ bond, $C^a—C^b$ bond in the case where $R^3$ is $COOR^1$, and C—C bond (in the case where n is 6 to 10)) in the cyclic skeleton may be each replaced with a double bond, each $R^1$ is independently a monovalent hydrocarbon group of 1 to 20 carbon atoms, plural R are each independently an atom or a group selected from a hydrogen atom, a hydrocarbon group of 1 to 20 carbon atoms, a halogen atom, a nitrogen-containing group, an oxygen-containing group, a phosphorus-containing group, a halogen-containing group and a silicon-containing group, and they may be bonded to one another to form a ring, but at least one R is not a hydrogen atom, in a skeleton of the ring formed from plural R bonded to one another, a double bond may be contained, and when two or more $C^a$ to each of which $COOR^1$ is bonded are contained in the skeleton of the ring, the number of carbon atoms to constitute the skeleton of the ring is in the range of 5 to 10;

[Chem. 2]

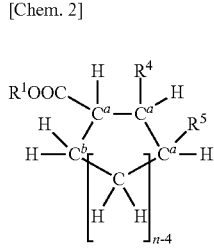

(2)

wherein n is an integer of 5 to 10,
$R^4$ and $R^5$ are each independently $COOR^1$ or a hydrogen atom, at least one of $R^4$ and $R^5$ is $COOR^1$, each $R^1$ is independently a monovalent hydrocarbon group of 1 to 20 carbon atoms, and single bonds ($C—C^b$ bond, $C^a—C^b$ bond in the case where $R^5$ is $COOR^1$, and C—C bond (in the case where n is 6 to 10)) in the cyclic skeleton may be each replaced with a double bond.

6. The propylene-based block copolymer as claimed in claim 5, wherein in the formula (1) and/or the formula (2), all the bonds between carbon atoms in the cyclic skeleton are single bonds.

7. The propylene-based block copolymer as claimed in claim 5, wherein in the formula (1) and/or the formula (2), n is 6.

8. The propylene-based block copolymer as claimed in claim 5, wherein the cyclic ester compound (a) is represented by the following formula (1a), and the cyclic ester compound (b) is represented by the following formula (2a);

[Chem. 3]

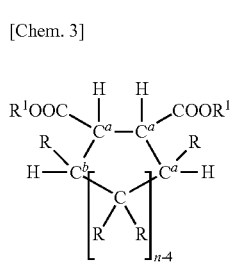

(1a)

wherein n is an integer of 5 to 10,
single bonds (C—C bond (in the case where n is 6 to 10), $C^a—C$ bond and $C^b—C$ bond) in the cyclic skeleton may be each replaced with a double bond, each $R^1$ is independently a monovalent hydrocarbon group of 1 to 20 carbon atoms, plural R are each independently an atom or a group selected from a hydrogen atom, a hydrocarbon group of 1 to 20 carbon atoms, a halogen atom, a nitrogen-containing group, an oxygen-containing group, a phosphorus-containing group, a halogen-containing group and a silicon-containing group, and they may be bonded to one another to form a ring, but at least one R is not a hydrogen atom, in a skeleton of the ring formed from plural R bonded to one another, a double bond may be contained, and when two or more $C^a$ to each of which $COOR^1$ is bonded are contained in the skeleton of the ring, the number of carbon atoms to constitute the skeleton of the ring is in the range of 5 to 10;

[Chem. 4]

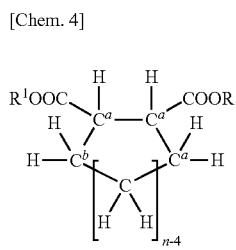

(2a)

wherein n is an integer of 5 to 10,
each $R^1$ is independently a monovalent hydrocarbon group of 1 to 20 carbon atoms, and single bonds (C—C bond (in the case where n is 6 to 10), $C_a—C$ bond and $C^b—C$ bond) in the cyclic skeleton may be each replaced with a double bond.

9. The propylene-based block copolymer as claimed in claim 8, wherein in the formula (1a) and the formula (2a), all the bonds between carbon atoms in the cyclic skeleton are single bonds.

10. The propylene-based block copolymer as claimed in claim 8, wherein in the formula (1a) and the formula (2a), n is 6.

11. A propylene resin composition comprising the propylene-based block copolymer as claimed in claim 1, and an inorganic filler and/or an elastomer.

12. A molded product comprising the propylene-based block copolymer as claimed in claim 1.

* * * * *